US012005579B2

(12) United States Patent
Kim et al.

(10) Patent No.: US 12,005,579 B2
(45) Date of Patent: Jun. 11, 2024

(54) ROBOT REACTING ON BASIS OF USER BEHAVIOR AND CONTROL METHOD THEREFOR

(71) Applicant: Samsung Electronics Co., Ltd., Gyeonggi-do (KR)

(72) Inventors: Jin-won Kim, Gyeonggi-do (KR); Jung-gap Kuk, Seoul (KR)

(73) Assignee: Samsung Electronics Co., Ltd (KR)

( * ) Notice: Subject to any disclaimer, the term of this patent is extended or adjusted under 35 U.S.C. 154(b) by 533 days.

(21) Appl. No.: 16/768,474

(22) PCT Filed: Sep. 12, 2018

(86) PCT No.: PCT/KR2018/010658
§ 371 (c)(1),
(2) Date: May 29, 2020

(87) PCT Pub. No.: WO2019/146866
PCT Pub. Date: Aug. 1, 2019

(65) Prior Publication Data
US 2021/0170585 A1    Jun. 10, 2021

(30) Foreign Application Priority Data

Jan. 29, 2018  (KR) .................. 10-2018-0010927

(51) Int. Cl.
*B25J 9/16*    (2006.01)
*B25J 11/00*   (2006.01)
*B25J 13/00*   (2006.01)

(52) U.S. Cl.
CPC .............. *B25J 9/163* (2013.01); *B25J 9/1697* (2013.01); *B25J 11/001* (2013.01); *B25J 11/0015* (2013.01); *B25J 13/003* (2013.01)

(58) Field of Classification Search
CPC ........ B25J 9/163; B25J 9/1697; B25J 11/001; B25J 11/0015; B25J 13/003; B25J 9/16;
(Continued)

(56) References Cited

U.S. PATENT DOCUMENTS 8,805,762 B2   8/2014   Jung et al.
8,996,429 B1   3/2015   Francis, Jr. et al.
(Continued)

FOREIGN PATENT DOCUMENTS

EP   2 933 070    10/2015
JP   2005238422   9/2005
(Continued)

OTHER PUBLICATIONS

Alonso et al. "A Multimodal Emotion Detection System during Human Robot Interaction" (Year: 2013).*
(Continued)

*Primary Examiner* — Rachid Bendidi
(74) *Attorney, Agent, or Firm* — The Farrell Law Firm, P.C.

(57) ABSTRACT

A robot for outputting various reactions according to user behaviors is disclosed. A control method for a robot using an artificial intelligence model, according to the present disclosure, comprises the steps of: acquiring data related to at least one user; inputting the data related to the at least one user into the artificial intelligence model as learning data so as to learn a user state for each user of which there is at least one; determining representative reactions corresponding to the user states learned on the basis of the data related to the at least one user; and inputting the input data into the artificial intelligence model so as to determine a user state of a first user and controlling the robot on the basis of a representative reaction corresponding to the determined user (Continued)

state, when input data related to the first user among the users, of which there is a least one, is acquired.

15 Claims, 30 Drawing Sheets

(58) Field of Classification Search
CPC ... B25J 9/1679; B25J 11/0005; G06N 3/0445; G06N 3/084; G06N 3/088; G06N 3/008; G06N 7/005; G06N 20/00; G06N 7/01; G06N 3/044; G05B 2219/40408; G05B 2219/40411; G05B 2219/40414
See application file for complete search history.

(56) References Cited

U.S. PATENT DOCUMENTS

| | | | |
|---|---|---|---|
| 2001/0001318 A1* | 5/2001 | Kamiya | G06N 3/008 700/264 |
| 2002/0052672 A1* | 5/2002 | Osawa | G06N 3/008 700/245 |
| 2003/0088367 A1* | 5/2003 | Kim | G06N 3/004 702/19 |
| 2008/0077277 A1* | 3/2008 | Park | G06N 3/008 901/46 |
| 2008/0119959 A1* | 5/2008 | Park | G06N 3/008 700/245 |
| 2012/0116584 A1 | 5/2012 | Kim et al. | |
| 2012/0159330 A1 | 6/2012 | Jeong et al. | |
| 2017/0339484 A1* | 11/2017 | Kim | A61B 5/6815 |
| 2018/0114125 A1 | 4/2018 | Ichiboshi et al. | |
| 2018/0121784 A1 | 5/2018 | Ichiboshi et al. | |
| 2019/0160683 A1 | 5/2019 | Hayashi | |

FOREIGN PATENT DOCUMENTS

| | | |
|---|---|---|
| JP | 5987473 | 9/2016 |
| KR | 1020120068253 | 6/2012 |
| KR | 1020120077052 | 7/2012 |
| KR | 1020130039578 | 4/2013 |
| KR | 1020130082701 | 7/2013 |
| KR | 1020130091364 | 8/2013 |
| KR | 101336641 | 12/2013 |
| KR | 1020140042994 | 4/2014 |
| KR | 1020160072621 | 6/2016 |
| KR | 101738142 | 5/2017 |
| KR | 1020170082571 | 7/2017 |
| WO | WO 2018/008323 | 1/2018 |

OTHER PUBLICATIONS

Korean Office Action dated Jan. 27, 2022 issued in counterpart application No. 10-2018-0010927, 24 pages.
PCT/ISA/210 Search Report issued on PCT/KR2018/010658 pp. 5. (dated Jan. 8, 2019).
PCT/ISA/237 Written Opinion issued on PCT/KR2018/010658, pp. 12. (dated Dec. 18, 2018).
McColl et al., "A Survey of Autonomous Human Affect Detection Methods for Social Robots Engagd in Natural HRI", Journal of Intelligent Robotic Systems, Aug. 23, 2015, 33pgs.
European Search Report dated Jan. 20, 2021 issued in counterpart application No. 18902051.4-1205, 12 pages.
Summons to Attend Oral Proceedings dated Feb. 23, 2024 issued in counterpart application No. 18902051.4-1205, 13 pages.

* cited by examiner

HAPPY  SADNESS  BOREDOM  ANGER

ROBOT REACTING ON BASIS OF USER BEHAVIOR AND CONTROL METHOD THEREFOR

PRIORITY

This application is a National Phase Entry of International Application No. PCT/KR2018/010658, which was filed on Sep. 12, 2018, and claims priority to Korean Patent Application No. 10-2018-0010927, which was filed in the Korean Intellectual Property Office on Jan. 29, 2018, the content of each of which is incorporated herein by reference.

TECHNICAL FIELD

The disclosure relates to a robot reacting on the basis of a user behavior and a control method therefore, and more particularly, to a robot capable of analyzing a user behavior and outputting an appropriate reaction to the user behavior, and a control method therefor.

The disclosure also relates to an artificial intelligence (AI) system that mimics functions of a human brain, such as cognition, judgment, and the like, using a machine learning algorithm and an application thereof.

BACKGROUND ART

An artificial intelligence (AI) system is a computer system that implements human-level intelligence, and a system that a machine itself learns, judges, and becomes smart, unlike an existing rule-based smart system. As the artificial intelligence system is more used, a recognition rate is improved and a user's taste may be more accurately understood. Therefore, the existing rule-based smart system has been gradually replaced by a deep learning-based artificial intelligence system.

Artificial intelligence technology includes machine learning and elemental technologies that utilize the machine learning.

The machine learning is an algorithm technology of classifying and learning features of input data by oneself, and the element technology is a technology of using an algorithm related to machine learning such as deep learning and includes technical fields such as linguistic understanding, visual understanding, inference/prediction, knowledge representation, a motion control, and the like.

Various fields to which the artificial intelligence technology is applied are as follows. The linguistic understanding is a technology of recognizing and applying/processing human languages/characters, and includes natural language processing, machine translation, a dialog system, question and answer, speech recognition/synthesis, and the like. The visual understanding is a technology of recognizing and processing things like human vision, and includes object recognition, object tracking, image search, human recognition, scene understanding, space understanding, image improvement, and the like. The inference/prediction is a technology of determining and logically inferring and predicting information, and includes knowledge/probability-based inference, optimization prediction, preference-based planning, recommendation, and the like. The knowledge representation is a technology of automating and processing human experience information as knowledge data, and includes knowledge establishment (data generation/classification), knowledge management (data utilization), and the like. The motion control is a technology of controlling autonomous driving of a vehicle, a motion of a robot, and the like, and includes a motion control (navigation, collision, driving), an operation control (behavior control), and the like.

On the other hand, recently, robots that provide various reactions according to user behaviors have been released. However, the conventionally released robots are characterized by repeatedly performing only a predetermined operation under predetermined conditions. Therefore, users who purchase the conventional robots may quickly get tired of the reactions of the robots.

DISCLOSURE

Technical Problem

The disclosure is to provide a robotic device and method that analyze a user behavior and provide appropriate output for the user behavior.

Technical Solution

According to an embodiment of the disclosure, a control method for a robot using an artificial intelligence model includes: acquiring data related to at least one user; learning the artificial intelligence model to acquire a user state for each of the at least one user by inputting user data related to the at least one user to the artificial intelligence model as learning data; determining a representative reaction corresponding to the user state on the basis of the user data; and determining a user state of a first user by inputting input data to the artificial intelligence model based on user data related to the first user of the at least one user acquired as the input data, and controlling the robot on the basis of a representative reaction corresponding to the determined user state.

The control method may further include determining, by the robot, a second user to determine the user state among a plurality of users based on a plurality of user data for the plurality of users acquired as the input data, wherein the controlling of the robot further includes determining the user state of the second user by inputting the input data to the artificial intelligence model based on user data related to the second user acquired as the input data, and controlling the robot on the basis of a representative reaction corresponding to the determined user state.

The learning of the user state may include: clustering a plurality of learning data into a plurality of clusters by inputting the plurality of learning data into the artificial intelligence model; and labeling user state corresponding to the plurality of clusters.

The determining of the representative reaction may include: acquiring a variance value of learning data included in a cluster generated by the clustering; and determining a representative reaction of the cluster by analyzing the acquired variance value.

The representative reaction may be at least one of a facial expression reaction, a motion reaction, or a voice reaction, and the controlling of the robot may further include: determining a robot reaction corresponding to the representative reaction; and outputting the robot reaction.

The control method may further include: determining the user state by inputting acquired input data to the artificial intelligence model based on the input data acquired for the robot reaction; and acquiring a character of the robot corresponding to the user state for the robot reaction.

The character of the robot may be determined according to the number of interactions with the user, the user state for the robot reaction, and the degree of completion of the robot reaction for the user reaction.

The learning data may be learning data including at least one of image data including a user, voice data including a user's voice, data about user's peripheral users, or data received from user's peripheral devices.

The artificial intelligence model may be learned using unsupervised learning, and the unsupervised learning may use at least one of a K-mean clustering technique or a gaussian mixture model (GMM) technique.

According to another embodiment of the disclosure, a robot using an artificial intelligence model includes: an inputter; an outputter; and a processor configured to: acquire user data related to at least one user through the inputter; learn the artificial intelligence model to acquire a user state for each of the at least one user by inputting the user data related to the at least one user to the artificial intelligence model as learning data; determine a representative reaction corresponding to the user state on the basis of the user data; and determine a user state of a first user by inputting input data to the artificial intelligence model based on user data related to the first user of the at least one user acquired as the input data through the inputter, and control the outputter to output a reaction the robot on the basis of a representative reaction corresponding to the determined user state.

The processor may be configured to: determine, by the robot, a second user to determine the user state among a plurality of users based on a plurality of user data for the plurality of users acquired as the input data; and determine the user state of the second user by inputting the input data to the artificial intelligence model based on user data related to the second user acquired as the input data, and control the outputter to output the reaction of the robot on the basis of a representative reaction corresponding to the determined user state.

The processor may be configured to: cluster a plurality of learning data into a plurality of clusters by inputting the plurality of learning data into the artificial intelligence model; and label user state corresponding to the plurality of clusters.

The processor may be configured to: acquire a variance value of learning data included in a cluster generated by the clustering; and determine a representative reaction of the cluster by analyzing the acquired variance value.

The representative reaction may be at least one of a facial expression reaction, a motion reaction, or a voice reaction, and the processor may be configured to: determine a robot reaction corresponding to the representative reaction; and control the outputter to output the robot reaction.

The processor may be configured to: determine the user state by inputting acquired input data to the artificial intelligence model based on the input data acquired for the robot reaction; and acquire a character of the robot corresponding to the user state for the robot reaction.

The character of the robot may be determined according to the number of interactions with the user, the user state for the robot reaction, and the degree of completion of the robot reaction for the user reaction.

The learning data may be learning data including information on at least one of image data including a user, voice data including a user's voice, data about user's peripheral users, or data received from user's peripheral devices.

The processor may be configured to be learned using unsupervised learning, and the unsupervised learning may use at least one of a K-mean clustering technique or a gaussian mixture model (GMM) technique.

Advantageous Effects

According to the diverse embodiments of the disclosure as described above, the robot may learn a user behavior to determine a user's state, and output an appropriate reaction according to the determined user' state.

BEST MODE

Figure 1:
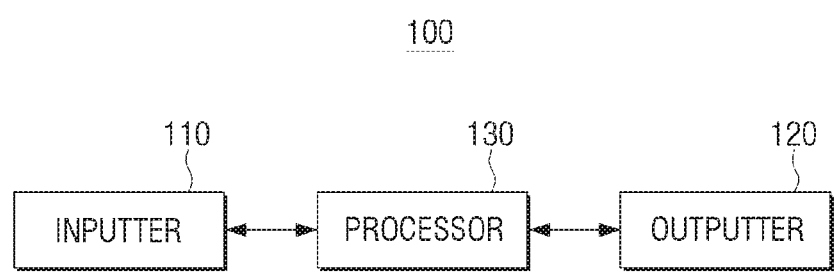
FIG. 1 is a block diagram illustrating a configuration of a robot according to an embodiment of the disclosure.

Hereinafter, diverse embodiments of the disclosure will be described with reference to the accompanying drawings. It should be understood that the embodiments and terms used therein are not intended to limit the technology described in the disclosure to specific embodiments, but include various modifications, equivalents, and/or replacements of the embodiments. Throughout the accompanying drawings, similar components will be denoted by similar reference numerals. Singular expressions may include plural expressions unless the context clearly indicates otherwise. In the disclosure, an expression "A or B", "at least one of A and/or B", or the like, may include all possible combinations of items listed together. Expressions "first", "second", or the like may indicate the corresponding components regardless of a sequence or importance of the components, will be used only in order to distinguish one component from the other components, and do not limit the corresponding components. When it is mentioned that any component (e.g., a first component) is "(functionally or communicatively) coupled with/to" or "connected to" to another component (e.g., a second component), any component may be directly connected to another component or may be connected to another component through the other component (e.g., a third component).

An expression "configured (or set) to" used in the disclosure may be interchangeably used with, for example, an expression "suitable for", "having the capacity to", "adapted to", "made to", "capable of", or "designed to" in hardware or software, depending on a situation. In any context, an expression "a device configured to" may mean that the device is "capable of" together with other devices or components.

For example, a phrase "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

An electronic device according to diverse embodiments of the disclosure may be various robots including a humanoid robot. The robot according to diverse embodiments of the disclosure may be various, such as, for example, a personal service robot providing a service to an individual user, a public service robot providing a public service, or a manufacturing robot used in an industrial site. Alternatively, the robot according to the diverse embodiments of the disclosure may be, for example, a general-purpose robot, a factory robot, an unmanned space exploration robot, a medical robot, or the like. The various robots may be a walking robot that moves with legs like a human or an animal, a wheel-type robot equipped with a wheel or a caterpillar, a flight-type robot, a submersible robot, and the like. Alternatively, the robot according to the diverse embodiments of the disclosure may be artificial intelligence implemented in software.

On the other hand, the electronic device according to the disclosure is described as a main embodiment in the case where the electronic device is the robot, but is not limited thereto. That is, the electronic device according to the diverse embodiments of the disclosure may include at least one of, for example, a smartphone, a tablet personal computer (PC), a mobile phone, an image phone, an e-book reader, a desktop personal computer (PC), a laptop personal computer (PC), a netbook computer, a workstation, a server, a personal digital assistant (PDA), a portable multimedia player (PMP), an MP3 player, a medical device, a camera, or a wearable device. The wearable device may include at least one of an accessory type (for example, a watch, a ring, a bracelet, an ankle bracelet, a necklace, a glasses, a contact lens, or a head-mounted-device (HMD)), a textile or clothing integral type (for example, an electronic clothing), a body attachment type (for example, a skin pad or a tattoo), or a bio-implantable circuit.

In some embodiments, the electronic device may include at least one of, for example, a television (TV), a digital video disk (DVD) player, an audio player, a refrigerator, an air conditioner, a cleaner, an oven, a microwave oven, a washing machine, an air cleaner, a set-top box, a home automation control panel, a security control panel, a media box (for example, HomeSync™ of Samsung Electronics Co., Ltd, TV™ of Apple Inc, or TV™ of Google), a game console (for example Xbox™, PlayStation™), an electronic dictionary, an electronic key, a camcorder, or a digital photo frame.

In other embodiments, the electronic device may include at least one of various medical devices (for example, various portable medical measuring devices (such as a blood glucose meter, a heart rate meter, a blood pressure meter, a body temperature meter, or the like), a magnetic resonance angiography (MRA), a magnetic resonance imaging (MRI), a computed tomography (CT), a photographing device, an ultrasonic device, or the like), a navigation device, a global navigation satellite system (GNSS), an event data recorder (EDR), a flight data recorder (FDR), an automobile infotainment device, a marine electronic equipment (for example, a marine navigation device, a gyro compass, or the like), avionics, a security device, an automobile head unit, an industrial or household robot, a drone, an automatic teller's machine (ATM) of a financial institute, a point of sales (POS) of a shop, or Internet of things (IoT) devices (for example, a light bulb, various sensors, a sprinkler system, a fire alarm, a thermostat, a street light, a toaster, an exercise equipment, a hot water tank, a heater, a boiler, and the like). According to some embodiments, the electronic device may include at least one of a portion of a furniture, a building/structure, or a car, an electronic board, an electronic signature receiving device, a projector, or various meters (for example, water, electricity, gas, electric wave meter, or the like). In diverse embodiments, the electronic device may be flexible or may be a combination of two or more of the various devices described above. The electronic device according to an embodiment of the disclosure is not limited to the devices described above.

Hereinafter, in the disclosure, the case of the robot among the various electronic devices described above will be described as an embodiment, but the technical idea applied to the disclosure may also be applied to the various electronic devices described above.

In the disclosure, a term "user" may be a person that uses the electronic device or a device (e.g., an artificial intelligence electronic device) that uses the electronic device. In addition, in the disclosure, user data may be used in combination with learning data or input data.

Hereinafter, each reaction of the robot will be briefly described, and the reaction of the robot will be described in detail using various illustrative diagrams and flowcharts according to the disclosure. The robot according to the disclosure may include 1) a step of collecting user data, 2) a step of analyzing the collected user data to cluster data and a step of determining a representative state and a representative reaction for an acquired cluster, 3) a step of performing a reaction of the robot corresponding input user data, based on the input user data, and 4) a step of determining a character of the robot.

[Step of Collecting User Data]

The robot may acquire user data related to a user. The user data may be used for clustering a user state, and may be used to determine a reaction of the robot corresponding to the user data according to a cluster acquired by clustering. In this case, the user data may be a concept including data (user motion, voice, biometric information, etc.) directly related to the user, as well as data (humidity, illuminance, temperature, or data about user's surrounding users) related to a user's surrounding environment.

The user data according to an embodiment of the disclosure may be acquired in various methods. As an example, when the robot includes a camera, the robot may acquire an image received through the camera as the user data. As another example, when the robot includes a microphone, the robot may acquire an audio signal received through the microphone as the user data. As still another example, when the robot includes various sensors, the robot may acquire the user data by analyzing information detected by the various sensors. For example, when the robot includes an infrared sensor, the robot may acquire data on the presence or absence of a user as the user data through the infrared sensor, or may acquire data on a user's body temperature or the like as the user data. Alternatively, when the robot includes a pressure sensor, the robot may acquire data on a physical contact with the user as the user data. Alternatively, when the robot includes an illuminance sensor, a humidity sensor, and the like, the robot may acquire humidity and illuminance information about the surrounding environment related to the user as the user data. In addition to the user data acquired using the above-described configurations, the robot may include various components to acquire various user data.

On the other hand, as described above, the user data may be acquired by the robot itself, but is not limited thereto. For example, the robot may collect the user data by communicating with other electronic devices. As an example, when the robot is included in an IoT system, the robot may receive the user data from other IoT devices. For example, when the user returns home after going out, the robot may receive the user data indicating that the user has entered the home from a door lock, which is another IoT device. Alternatively, the robot may receive the user data regarding music preferred by the user through a speaker, which is another IoT device, or may receive the user data for a program preferred by the user through a TV.

At this time, the user data may be acquired in a state in which the robot is powered on. However, in order to reduce power consumption of the robot, power for some components may be selectively activated in the step of acquiring the user data. For example, when the robot detects that the user is located around the robot in a state in which only the power of the infrared sensor is activated, the robot may activate the power of the camera or microphone. Through the method as described above, the robot may prevent unnecessary power consumption.

On the other hand, when the user data is acquired by the various methods described above, the robot may cluster the collected user data. However, when a size of the clustered data is large, data analysis may take a lot of time. Therefore, the robot may select and remove unnecessary data from the acquired data. That is, when the user exists around the robot, but there is no special event for a user behavior, the robot may remove the user data without the special event. For example, when the user has been in the sleep state for 8 hours, the robot may remove all user data for the sleep state, or may remove the rest of the data except for the user data for a portion (for example, video and sound captured for 1 minute) and analyze only necessary data.

Meanwhile, the user data acquired by the robot may be user data for a plurality of users. For example, when a first user and a second user exist around the robot, the robot may acquire first user data for the first user and second user data for the second user. That is, when the robot acquires data for the plurality of users, the robot may classify and manage the data for the plurality of users for each user. At this time, the robot may classify the data for the plurality of users for each user through various methods. For example, when the robot acquires the user data through the camera, the robot may classify the data for the plurality of users for each user by analyzing the acquired image. Alternatively, when a door lock, which is one of the IoT devices, uses user biometric information such as fingerprint recognition or iris recognition, the robot may receive an already classified user data from the door lock.

[Step of Analyzing Collected User Data to Cluster Data and Step of Determining Representative State and Representative Reaction for Acquired Cluster]

When various user data is acquired by the above-described method, the robot may cluster the user data to acquire a cluster for the user data and determine a representative state for the acquired cluster. At this time, the representative state for the cluster may be a user's emotional state. However, the representative state for the cluster is not limited thereto, and may be various states related to the user, such as a next expected behavior for a user's action, a user's schedule, and a user's habit.

The robot may cluster the user data through unsupervised learning. At this time, the unsupervised learning may use a K-mean clustering algorithm, a gaussian mixture model (GMM) algorithm, or the like, but is not limited thereto.

As an example, the robot may cluster the user data using the K-mean clustering algorithm. Specifically, 1) when a set (D) of user data and the number (k) of clusters are input, the robot may randomly extract k objects from the set D of user data and set the extracted k user data as a centroid of each cluster. 2) The robot may acquire k clusters based on the centroid of the cluster. Specifically, the robot may acquire a cluster by calculating a distance for each user data included in the set D of user data and each of the extracted k user data, and determining which centroid has the most similarity to each user data. 3) The robot may reset the centroid of the cluster based on the user data included in the acquired cluster, and reset k clusters based on the reset centroid. That is, the robot may repeat a process of acquiring a cluster from an arbitrary centroid (k centroids), recalculating the centroid of the acquired cluster to determine a new centroid, and acquiring a new cluster from the new centroid (k centroids), until the centroid of the cluster does not change. Through the method described above, the robot may acquire a cluster for the input data. On the other hand, in the above-described embodiment, the method of acquiring the cluster through the K-means clustering algorithm has been described, but the cluster may be acquired by various other methods such as the GMM algorithm.

When at least one cluster for the user data is acquired according to the various methods described above, the robot may determine a representative state for each cluster. For example, when the user data is image data and the user state is a user emotional state, user emotion for the cluster may be classified through a user face analysis, an emotion analysis, and the like. Specifically, the robot may analyze emotion of user data by performing face recognition, emotion recognition, and the like from image data included in each cluster.

When all user emotions for the user data of each cluster are analyzed, the robot may determine a representative emotion of the corresponding cluster based on the analyzed user emotions. For example, when any cluster includes 10 user data, and there are 5 user data in a 'happy' emotion state, 2 user data in a 'pleasant' emotion state, 2 user data in an 'angry' emotion state, and 1 user data in an 'unclear' emotion state, the robot may determine the representative emotion of the cluster as 'happy'.

Figure 4A:
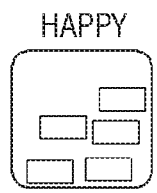
FIGS. 4A to 4D are illustrative diagrams for describing a clustering method according to an embodiment of the disclosure.
Figure 4A:
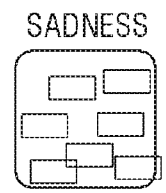
Figure 4A:
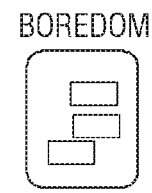
Figure 4A:
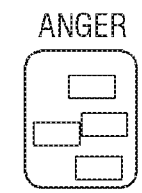

Through the method described above, the robot may determine the representative emotion for each cluster. Specifically, as illustrated in FIG. 4A, the representative emotions of each cluster may be happiness, sadness, boredom, and anger. However, the representative emotions of the cluster may be various, such as love and hunger, in addition to the above-described emotions.

Figure 4B:
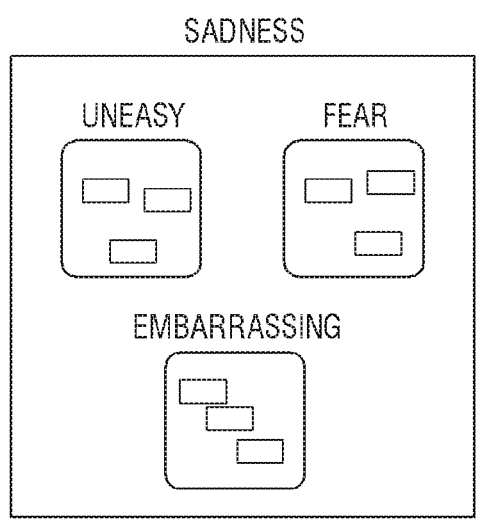

In addition, as illustrated in FIG. 4B, one cluster may include a plurality of sub-clusters which are subdivided. For example, as illustrated in FIG. 4B, the 'sadness' cluster may include an 'uneasy' sub-cluster, a 'fear' sub-cluster, an 'embarrassing' sub-cluster, and the like.

Figure 4C:
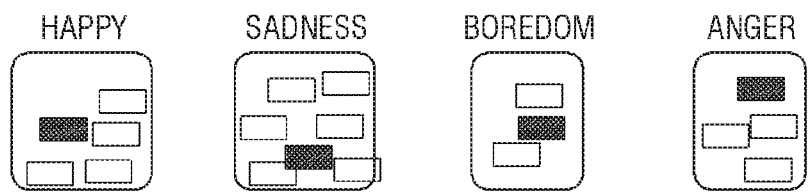

Meanwhile, when the representative emotion of the cluster is determined through the above-described method, the robot may determine a representative reaction corresponding to the representative emotion of each cluster, as illustrated in FIG. 4C. As an example, the representative reaction may be a representative motion related to a user motion. Specifically, the robot may acquire skeleton data for one user data among the user data included in the cluster, and acquire a motion corresponding to the acquired skeleton data as a representative motion of the corresponding cluster. In this case, the skeleton data refers to data obtained by extracting feature points such as joints of a user image included in the user data.

In this case, the user data corresponding to the skeleton data may be acquired in various methods. As an example, the user data corresponding to the skeleton data may be randomly selected user data among the user data included in the cluster.

As another example, the user data corresponding to the skeleton data may be user data related to the representative emotion of the cluster. Specifically, the robot may acquire the user data corresponding to the skeleton data by generating distribution of the user data in the cluster, and extracting statistics such as average, median, and random samples from the distribution. In this case, the robot may generate the distribution in consideration of the similarity between the emotion of the user data and the representative emotion of the cluster. For example, as described above, it is assumed that when any cluster includes 10 user data, and there are 5 user data in a 'happy' emotion state, 2 user data in a 'pleasant' emotion state, 2 user data in an 'angry' emotion state, and 1 user data in a 'unclear' emotion state, the robot determines the representative emotion of the cluster as 'happy'. The robot may assign a weight of 1 to the user data determined as 'happy', assign a weight of 0.7 to the user data determined as 'pleasant', assign a weight of 0.3 to the user data determined as 'angry', and assign a weight of 0.1 to the user data determined as 'unclear'. The robot may generate the distribution by applying the user data to which the weight is assigned, and acquire user data corresponding to the average, median, and random sample from the generated distribution as the user data corresponding to the skeleton data.

Meanwhile, in the above-described embodiment, the case where the representative reaction is the representative motion has been described, but is not limited thereto. That is, the robot may determine the representative reaction by the same method even when the user data is data for a user's facial expression and data for a user's voice.

Meanwhile, the clustering descried above may also be performed using artificial intelligence using machine learning such as deep learning and element technologies utilizing the machine learning. For example, the clustering according to the disclosure may be implemented using a model such as a deep neural network (DNN), a recurrent neural network (RNN), or a bidirectional recurrent deep neural network (BRDNN), which will be described later in detail.

Meanwhile, the clustering as described above may be performed by a processor inside the robot, but may also be performed through an external server. When the clustering is performed on the external server, the clustering may be performed using either online or offline. For example, when the clustering is performed online, the robot may immediately perform the clustering whenever the user data is collected. In this case, if there is a change in a behavior pattern according to the user's emotional state, the robot may gradually reflect the change in the user behavior pattern.

Alternatively, when the clustering is performed offline, the robot may collect the user data for a period of time and cluster the collected data at once. In this case, it is not possible to immediately reflect the change in the behavior pattern according to the user's emotional state, but an effect such as reduction in power consumption or reduction in computation time may occur. At this time, when the clustering is performed offline, the method that the robot clusters the user data may vary. For example, the robot may transmit the user data to the external server in order to cluster the collected user data every a predetermined time. Alternatively, the robot may transmit the user data to the external server in order to cluster the user data when the user data of a predetermined capacity is collected. Alternatively, the robot may transmit the user data to the external server to cluster the user data during a period in which the user data is not collected or a period in which the user is not recognized. For example, the robot may transmit the user data to the external server in order to cluster the user data at a time when the user is asleep or when the user goes out. In addition, the results clustered by the server may be received and stored to be used when performing an operation of the robot. At this time, the clustering performed by the server may include not only an operation of acquiring the cluster by classifying the user data, but also an operation of acquiring the representative state for the acquired cluster. However, the clustering is not limited thereto, and the server may classify the user data to acquire the cluster, and the robot may acquire the representative state of the acquired cluster. Meanwhile, as described above, the robot may classify the data for the plurality of users for each user. At this time, the robot may learn each user emotion for each user. That is, when the robot acquires first learning data for the first user and second learning data for the second user, the robot may acquire first emotion clusters for the first learning data, and second emotion clusters for the second learning data.

In the above-described embodiment, the case in which the user state is the user emotion state has been described, but the clustering may be performed through the same method for various user states other than the user emotion state.

[Step of Outputting Reaction of Robot Corresponding to Acquired User Data, Based on Acquired User Data]

As described above, the robot may receive the user data and acquire the cluster for the received user data, and the robot may output various reactions based on the received user data.

At this time, the reaction output by the robot may be various, such as a motion reaction, a voice reaction, and a facial expression reaction. Specifically, the motion reaction may be a reaction related to a movement output by the robot with respect to the user data. The voice reaction may be various audio signals (language, onomatopoeia, mimetic word, music, etc.) output by the robot with respect to the user data. The facial expression reaction may be an expression output by the robot with respect to the user data.

As described above, when the robot acquires the user data through various methods, the robot may determine and perform the reaction of the robot corresponding to the user data. At this time, the reaction of the robot corresponding to the user data may be determined using at least one acquired cluster. That is, when the user data is acquired, the robot may determine which cluster the acquired user data is user data corresponding to. For example, when it is determined that the user data acquired by the robot is data corresponding to a 'happy' cluster, the robot may perform a reaction corresponding to the 'happy' cluster. At this time, the reaction corresponding to the 'happy' cluster may be a representative reaction to the 'happy' cluster.

In addition, in the above-described embodiment, it has been described that the robot performs the representative reaction of the cluster corresponding to the user data, but is not limited thereto.

As an example, the robot may perform a representative reaction of a cluster related to the cluster corresponding to the user data. For example, when the cluster corresponding to the user data is a 'sadness' cluster, the robot may perform the operation of the robot using representative reactions such as a 'happy' cluster, an 'antics' cluster, and a 'pleasant' cluster, so that the user may overcome sadness.

As another example, the robot may perform the operation of the robot using a representative reaction of the cluster corresponding to other user data related to the user data. For example, when the cluster corresponding to the user data collected in the past is the 'sadness' cluster, and the cluster corresponding to the data of other users with the user is the 'antic' cluster, the robot may perform the operation of the robot using a representative reaction of the 'antic' cluster corresponding to other user data. At this time, the robot may perform the operation of the robot using data of other users according to the relationship or intimacy between the user and other users. For example, when the intimacy between the user and other users is high (e.g., a family), the robot may perform the operation of the robot using data of other users.

Figure 4D:
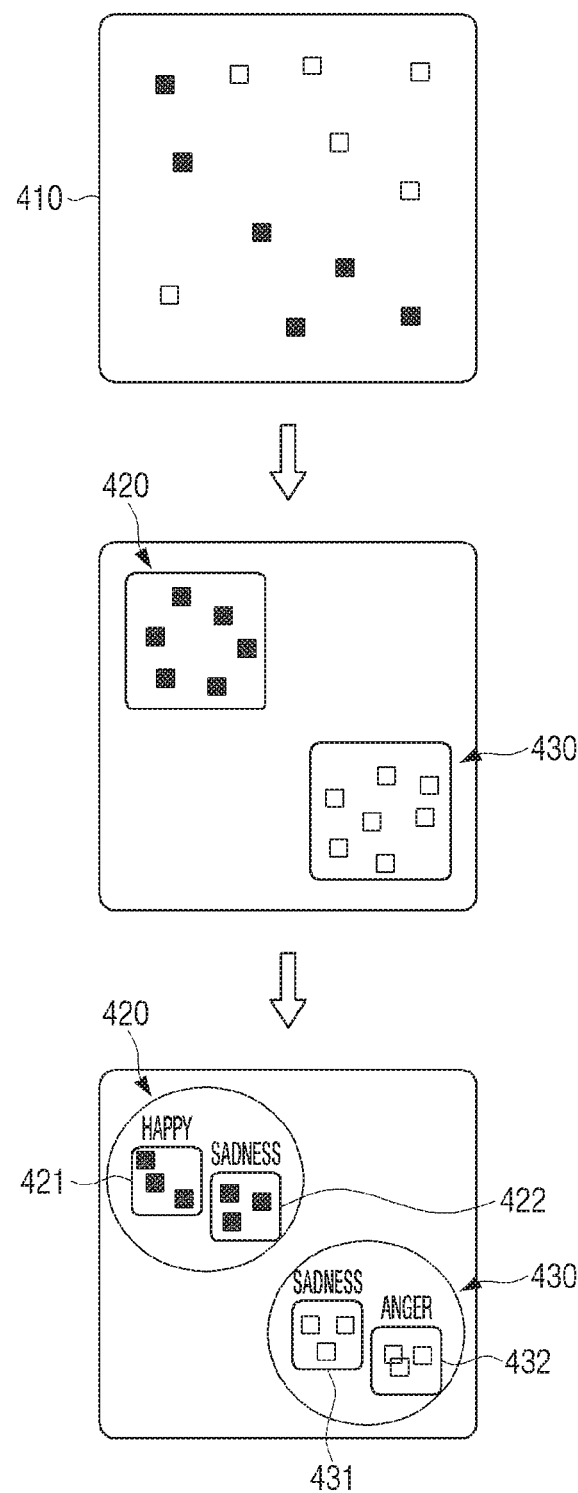

As described above, the robot may classify the user data for the plurality of users for each user, and perform the clustering for each user. Accordingly, the robot may collect different user data for each user, acquire different clusters, and output different reactions for each user. That is, as illustrated in FIG. 4D, the robot may acquire user data 410 for a plurality of users. The robot may classify the acquired data for each user. That is, the robot may classify the user data 410 into first user data 420 and second user data 430 and perform clustering on each of the classified data. That is, the robot may cluster the first user data 420 to acquire a happy cluster 421 and a sadness cluster 422, and may cluster the second user data 430 to acquire a sadness cluster 431 and an anger cluster 432. Through this, the robot may output different reactions to different users.

[Step of Determining Character of Robot]

Meanwhile, the robot may build a character of the robot according to an interaction with the user. As an example, after the robot outputs the reaction to the user data, the character of the robot may be determined according to the user interaction with the output reaction of the robot. For example, when the user interaction for the reaction output of the robot is a 'praise' interaction, the character of the robot may be a confident character. Alternatively, when the user interaction for the reaction output of the robot is a 'scold' interaction, the character of the robot may be a timid character. As another embodiment, the character of the robot may be similar to that of the user acquired by analyzing the user data.

That is, the character of the robot may be changed, expanded, or reduced as the interaction with the user is performed. Depending on the generated character of the robot, the reaction output by the robot in the same situation may vary.

Hereinafter, the configuration and operation of the robot according to the disclosure will be described in detail.

FIG. 1 is a block diagram illustrating a configuration of a robot according to an embodiment of the disclosure.

Specifically, a robot 100 includes an inputter 110, an outputter 120, and a processor 130. As described above, the robot 100 according to the disclosure may be configured as various electronic devices, but a case where the electronic device according to the disclosure is the robot 100 will be described below.

The inputter 110 is a configuration for acquiring user data around the robot 100. The inputter 110 may acquire pictures and images around the robot 100 as the user data. Alternatively, the inputter 110 may acquire sounds around the robot 100 as the user data. However, the inputter 110 is not limited to the above-described embodiment, and may acquire data in various formats as the user data. For example, the inputter 110 may acquire data directly input by the user as the user data. Alternatively, the inputter 110 may acquire data received from peripheral electronic devices as the user data. For example, if the robot 100 may be connected to an IoT system, the inputter 110 may use data received from peripheral IoT devices as the user data.

The outputter 120 may output a reaction of the robot 100 to a user behavior. At this time, the output output through the outputter 120 may have various forms. For example, the output output through the outputter 120 may be various, such as a motion output, a voice output, and a control output.

The processor 130 controls the overall operation of the robot 100. Specifically, the processor 130 may acquire user data related to at least one user, and analyze the acquired user data related to at least one user. As an example, when the user data is learning data including at least one of a user facial expression, a user motion, or a user voice, the robot may acquire the user data as described above and analyze user emotions included in the acquired user data. For example, the user emotion may be 'joy', 'sadness', 'boredom', 'anger', and the like.

At this time, the processor 130 may determine a representative reaction corresponding to the user emotion based on at least one of the user motion or the user voice. The processor 130 may analyze the user data including at least one of the user motion or the user voice to determine the user emotion, and control the robot 100 based on the representative reaction corresponding to the user emotion.

In addition, when user data for a plurality of users is input through the inputter 110, the processor 130 may classify and cluster the user data for the plurality of users for each user. For example, when first user data for a first user and second user data for a second user are input through the inputter 110, the processor 130 may classify the first user data and the second user data, perform clustering on the first user data, and perform clustering on the second user data.

Meanwhile, the user data may be various such as user data related to user schedules, user data related to user life patterns, user data related to surrounding environment information, and user data related to a behavior desired by the user, as well as the user data related to the user emotions.

Figure 2:
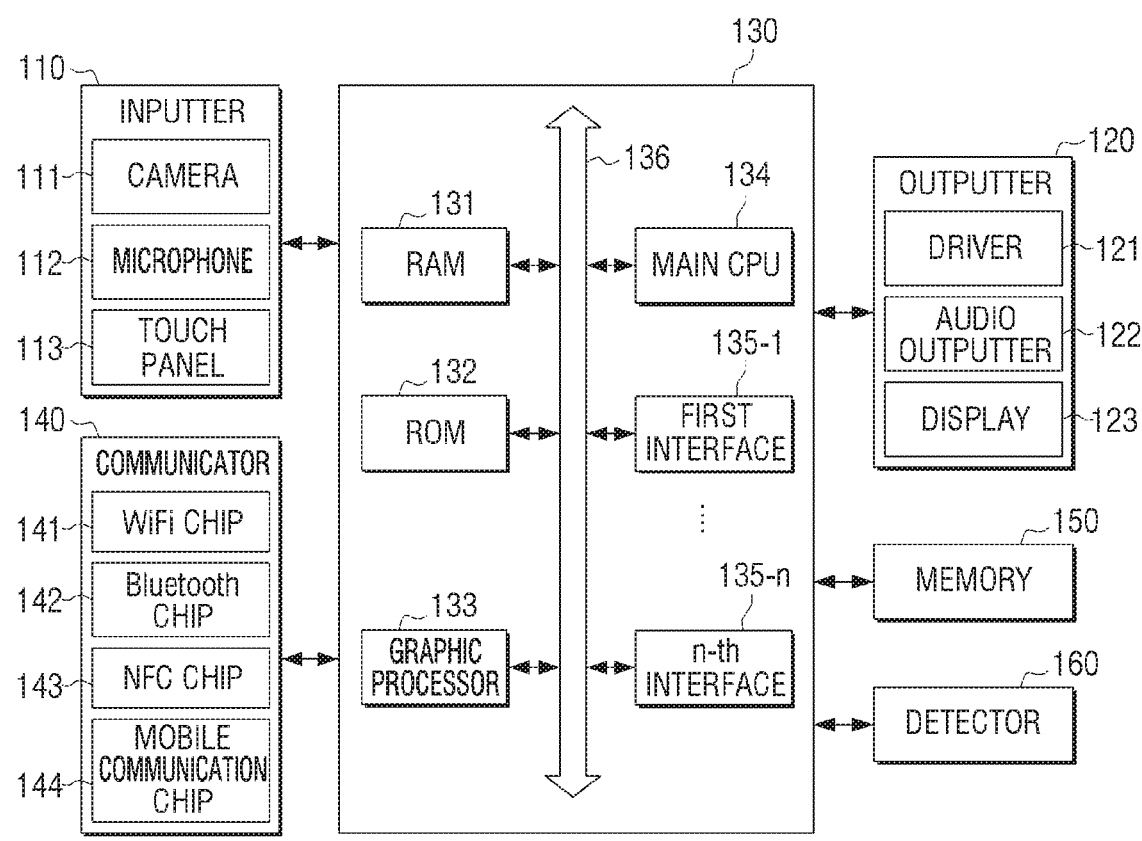
FIG. 2 is a block diagram illustrating in detail the configuration of the robot according to an embodiment of the disclosure.

FIG. 2 is a block diagram illustrating in detail the configuration of the robot according to an embodiment of the disclosure.

Specifically, the robot 100 may further include a communicator 140, a memory 150, and a detector 160, in addition to the inputter 110, the outputter 120, and the processor 130.

The inputter 110 may include a camera 111, a microphone 112, a touch panel 113, and the like to acquire various external inputs.

The camera 111 is a configuration for acquiring image data around the robot 100. The camera 111 may capture still images and videos. For example, the camera 111 may include one or more image sensors, a lens, an image signal processor (ISP), or a flash (e.g., an LED or xenon lamp, etc.), and may be configured as a plurality of cameras 111. At this time, in order to prevent unnecessary power consumption, the camera 111 may be activated only when certain conditions are satisfied. For example, the camera 111 may be activated only when the user is detected around the robot 100. Alternatively, when the robot 100 is a part of the IoT system, the camera 111 may be activated when a condition that a front door is opened or an indoor lighting is turned on is satisfied. However, the camera 111 is not limited to the above-described embodiment, and may be always activated when power is applied to the robot. When the camera 111 is always activated, the camera 111 may store an image or perform image processing only when a specific condition is satisfied. The specific condition may be a condition in which the user is detected around the robot 100, or a condition in which the front door is opened or the indoor lighting is turned on when the robot 100 is a part of the IoT system.

The microphone 112 is a configuration for acquiring sounds around the robot 100. The microphone 112 may receive external acoustic signals and generate electrical voice information, and the robot 100 may include a plurality of microphones 112. The robot 100 may estimate a direction of a sound source generating an acoustic signal using a difference in arrival time of the acoustic signal input to each of the plurality of microphones. The microphone 112 may use various noise removal algorithms to remove noise generated in a process of receiving the external acoustic signal. As in the case of the camera 111, in order to prevent unnecessary power consumption, the microphone 112 may be activated only when certain conditions are satisfied. That is, the microphone 112 may be activated only when the user is detected around the robot 100. Alternatively, when the robot 100 is a part of the IoT system, the microphone 112 may be activated when a condition that a front door is opened or an indoor lighting is turned on is satisfied. However, the microphone 112 is not limited to the above-described embodiment, and may be always activated as in the case of the camera 111.

The touch panel 113 is a configuration capable of receiving various user inputs. The touch panel 113 may receive user data by user manipulation. The touch panel may also be activated under the conditions as described above to prevent unnecessary power consumption. Alternatively, the touch panel 113 may also be activated only when a user's touch is detected. The touch panel 113 may be configured in combination with a display described later.

The input unit 110 may be various configurations for receiving various user data in addition to the camera 111, the microphone 112, and the touch panel 113 described above.

The outputter 112 may include a driver 121, an audio outputter 122, and a display 123.

The driver 121 is a configuration for outputting various motions as the reaction to the user data acquired through the inputter 110. When the robot 100 according to an embodiment of the disclosure is a humanoid robot 100, the driver 121 may include a motor or an actuator capable of driving at least one joint corresponding to a human' joint. As another example, when the robot 100 according to an embodiment of the disclosure is a wheel-type robot, the driver 121 may include a motor or an actuator capable of driving a wheel.

The audio outputter 122 is a configuration for outputting various audio signals as the reaction to the user data acquired through the inputter 110. The audio outputter 122 may output various alarms or audio messages as well as various audio data on which various processing operations such as decoding, amplification, noise filtering, and the like, are performed by an audio processor (not illustrated). In particular, the audio outputter 122 may be implemented as a speaker, but this is only one example, and the audio outputter 122 may be implemented as an output terminal that may output audio data.

The display 123 is a configuration for outputting images as various reactions to the user data acquired through the inputter 110. As an example, the display 123 may output an avatar image for expressing emotion. That is, when the robot 100 intends to output delightful emotion as the reaction to the user data acquired through the inputter 110, the delightful emotion may be output through the avatar image displayed on the display 123. Meanwhile, the display 123 for providing various images may be implemented as various types of display panels. For example, the display panel may be implemented by various display technologies such as a liquid crystal display (LCD), an organic light emitting diode (OLED), an active-matrix organic light-emitting diode (AM-OLED), a liquid crystal on silicon (LcoS), or a digital light processing (LDP). In addition, the display 123 may also be coupled to at least one of a front region, a side region, or a rear region of the robot 100 in the form of a flexible display.

The communicator 140 may perform communication with the external device. In particular, the communicator 140 may include various communication chips or circuits for performing wireless communication, such as a wireless fidelity (WiFi) chip 141, a Bluetooth chip 142, a near field communication (NFC) chip 143, and a mobile communication chip 144. At this time, the WiFi chip 141, the Bluetooth chip 142, and the NFC chip 143 perform communication in a LAN scheme, a WiFi scheme, a Bluetooth scheme, an NFC scheme, respectively. In the case of using the WiFi chip 141 or the Bluetooth chip 142, various kinds of connection information such as a service set identifier (SSID), a session key, and the like, are first transmitted and received, communication is connected using the connection information, and various kinds of information may then be transmitted and received. The mobile communication chip 144 refers to a chip that performs communication according to various communication protocols such as $3^{rd}$ generation (3G), $3^{rd}$ generation partnership project (3GPP), long term evolution (LTE), and the like. On the other hand, the communicator 140 may also perform communication in a wired communication scheme including at least one of universal serial bus (USB), high definition multimedia interface (HDMI), recommended standard 232 (RS-232), a power line communication, or plain old telephone service (POTS). In particular, the communicator may transmit and receive various data to determine a user state by performing communication with the external devices. Alternatively, when user state analysis is performed on an external server, the communicator 140 may transmit collected learning data to the external server and receive an analysis result of the learning data.

The memory 150 may store, for example, commands or data for controlling at least one component of the robot 100. According to an embodiment, the memory 150 may store software and/or programs. The program may include, for example, a kernel, middle-ware, an application programming interface (API), and/or an application program (or "application"). At least a portion of the kernel, middleware, or API may be referred to as an operating system (OS). The kernel, for example, may control or manage system resources used to execute operations or functions implemented in other programs. In addition, the kernel may provide an interface capable of controlling or managing the system resources when accessing individual components of the robot 100 in the middleware, the API, or the application program.

The middleware may act as an intermediary so that, for example, the API or the application program communicates with the kernel to exchange data. In addition, the middleware may process one or more job requests received from the application program according to priority. For example, the middleware may assign priority capable of using the system resources of the robot 100 to at least one of the application programs and process the one or more job requests. The API is an interface for the application program to control functions provided by the kernel or middleware, and may include, for example, at least one interface or function (e.g., instruction) for file control, window control, image processing, or character control.

In addition, the memory 150 may include at least one of an internal memory or an external memory. The internal memory may include at least one of, for example, a volatile memory (for example, a dynamic random access memory (DRAM), a static RAM (SRAM), a synchronous dynamic RAM (SDRAM), or the like), a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, or the like), a flash memory, a hard drive, or a solid state drive (SSD). The external memory may include a flash drive such as a compact flash (CF), a secure digital (SD), a micro-SD, a mini-SD, an extreme digital (xD), a multimedia card (MMC), a memory stick, or the like. The external memory may be functionally or physically connected to the robot 100 through various interfaces.

The detector 160 is a configuration for acquiring information around the robot 100. As described above, the detector 160 may include various sensors, and may acquire information detected by the sensors as the user data. The detector 160 may include various sensors such as an infrared sensor, a pressure sensor, an illuminance sensor, a humidity sensor, and a gyro sensor. For example, when the detector 160 includes the infrared sensor, the detector 160 may acquire data on the presence or absence of a user as the user data through the infrared sensor, or may acquire data on a user's body temperature or the like. Alternatively, when the detector 160 includes the pressure sensor, the detector 160 may acquire data on physical contact with the user as the user data. Alternatively, when the robot 100 includes the illuminance sensor, the humidity sensor, and the like, the robot may acquire information on humidity and illuminance related to a surrounding environment of the user as the user data.

The processor 130 may control an overall operation of the robot 100 using various programs stored in the memory 150.

The processor 130 includes a random access memory (RAM) 131, a read only memory (ROM) 132, a graphic processor 133, a main central processing unit (CPU) 134, first to n-th interfaces 135-1 to 135-n, and a bus 136. At this time, the RAM 131, the ROM 132, the graphic processor 133, the main CPU 134, the first to n-th interfaces 135-1 to 135-n, and the like, may be connected to each other through the bus 136.

The RAM 131 stores the OS and the application programs. Specifically, when the robot 100 is booted, the OS may be loaded on the RAM 131 and various application data selected by the user may be loaded on the RAM 131.

An instruction set for booting a system, or the like is stored in the ROM 132. When a turn-on command is input to supply power, the main CPU 134 may copy the OS stored in the memory 150 to the RAM 131 according to an instruction stored in the ROM 132, and execute the OS to boot the system. When the booting is completed, the main CPU 134 copies various application programs stored in the memory 150 to the RAM 131, and executes the application programs copied to the RAM 131 to perform various operations.

The graphic processor 133 generates a screen including various objects such as a graphical user interface (GUI) item, image, text, and the like, using a calculator (not illustrated) and a renderer (not illustrated). Here, the calculator may be a configuration that calculates attribute values, such as coordinate values, shapes, sizes, and colors, to which each object is to be displayed according to a layout of a screen using a control command received from the inputter 140. In addition, the renderer may be a configuration that generates a screen of various layouts including the objects on the basis of the attribute values calculated by the calculator. The screen generated by such a renderer may be displayed in a display region of the display 130.

The main CPU 134 accesses the memory 150 to perform the booting using the OS stored in the memory 150. In addition, the main CPU 134 performs various operations using various programs, contents, data, and the like, stored in the memory 150.

The first to n-th interfaces 135-1 to 135-n are connected to the various components described above. One of the first to n-th interfaces 135-1 to 135-n may also be a network interface connected to an external device through a network.

Figure 3A:
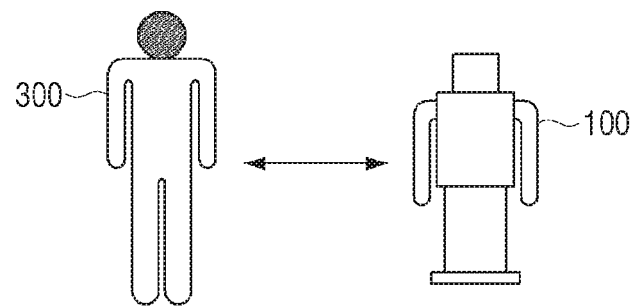
FIGS. 3A and 3B are illustrative diagrams for describing users interacting with the robot according to an embodiment of the disclosure.
Figure 3B:
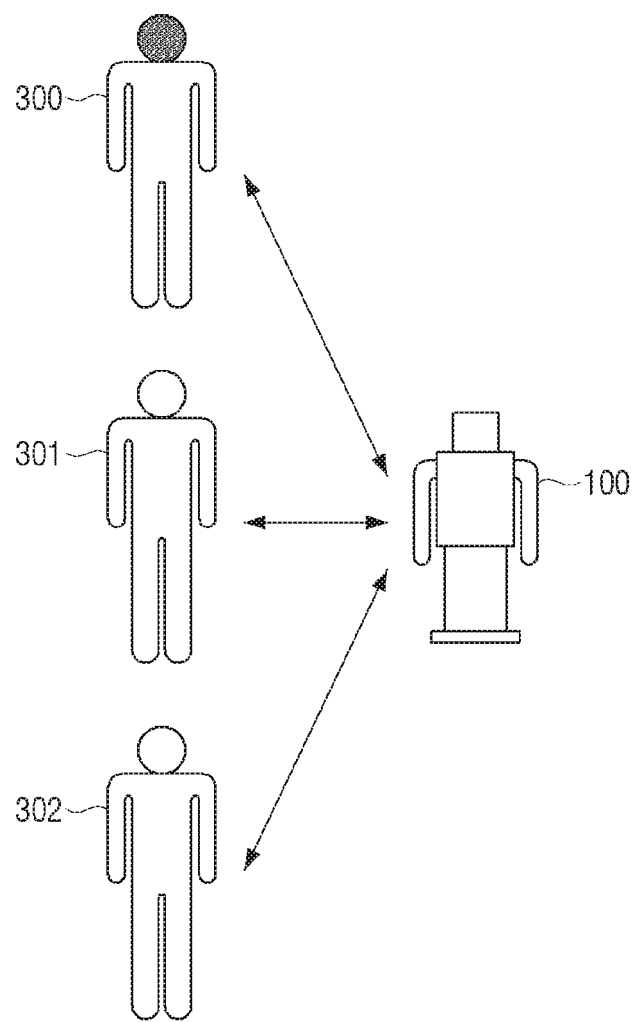

FIGS. 3A and 3B are illustrative diagrams for describing users interacting with the robot according to an embodiment of the disclosure.

Specifically, the robot 100 may recognize a predetermined specific user 300 (hereinafter, an owner) as a user for interacting. That is, as illustrated in FIG. 3A, the robot 100 may acquire and analyze user data on a behavior of the owner 300 as learning data, and may output an appropriate reaction according to the analyzed learning data when the user data for the behavior of the owner 300 is input as input data.

However, as illustrated in FIG. 3B, when other users 301 and 302 other than the owner are present together around the robot 100, the robot 100 may acquire user data for other users 301 and 302 including the owner 300 together. However, in the case of FIG. 3B, the output of the robot 100 reacting to the owner 300 and the output of the robot 100 reacting to other users 301 and 302 may be different. As an example, when the owner 300 is smiling and other users 301 and 302 are angry with the owner, the robot 100 may output a smiling reaction together with the owner as a reaction to the smiling owner 300. However, when other users are smiling and the owner is angry with other users, the robot 100 may output a reaction that is angry with other users together with the owner, or output a reaction that comforts the owner.

That is, although the robot 100 acquires user data for a plurality of users, the robot 100 may output a reaction based on the user data for the owner. At this time, as illustrated in FIGS. 3A and 3B, the owner does not need to be one, and a plurality of users may be set as the owner.

In addition, the owner may be set by the user's input, but may vary depending on the number of interactions with the robot 100. For example, the owner of the robot 100 may be determined according to the number of times the user and the robot 100 have interacted. However, the owner is not limited to the above-described embodiment, and may be determined according to the user's input, and for a user other than the owner, a user that the number of interactions between the robot 100 and the user is a predetermined number or more may also be determined as a sub-owner.

Figure 5:
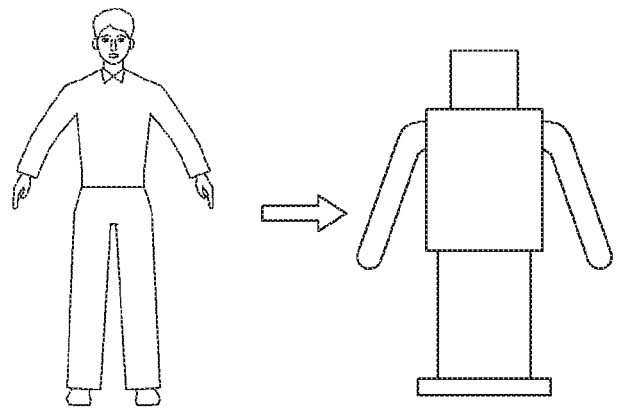
FIG. 5 is an illustrative diagram for describing a method of performing a motion operation by a robot when a reaction of the robot according to the disclosure is the motion operation.
Figure 5:
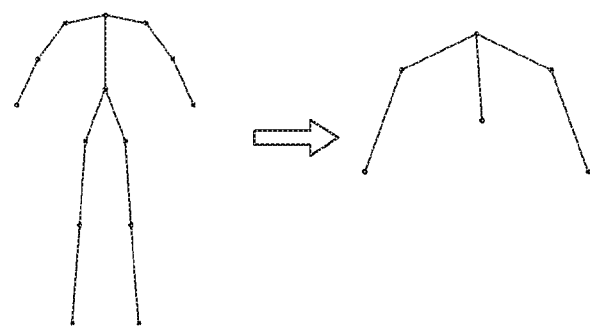

FIG. 5 is an illustrative diagram for describing a method of performing a motion operation by a robot when a reaction of the robot according to the disclosure is the motion operation.

As described above, the robot 100 may perform a motion operation for the input user data. At this time, the motion operation output by the robot 100 may be a representative reaction to any one of the acquired clusters. That is, the robot 100 may mimic the representative reaction to the cluster. At this time, depending on the structure of the robot 100, the mimicked representative reaction of the user may vary.

However, the motion operation of the robot 100 according to the same representative reaction may vary depending on the structure of the robot 100. For example, when the robot 100 is a complete humanoid robot capable of perfectly reproducing human's movement, the robot 100 may perform the same motion operation as the representative reaction. However, for example, as illustrated in FIG. 5, when the number of joints of the user is 14 and the number of joints of the robot 100 is 6, the robot 100 may not perform the same motion operation as the representative reaction. In this case, because the number of joints (6) the robot 100 has is smaller than the number of joints (14) required to perform the representative reaction, the robot 100 may operate by simplifying the representative reaction by determining the number, location, and operation of its own joints and the number, location, and operation of the user's joints, and grasping the joints required for the representative reaction. Alternatively, the user repeatedly learns the movements of the six joints of the robot 100 corresponding to the 14 joints of the person to the robot 100, so that the robot 100 may learn its own motion according to the motion operation of the person.

That is, as described above, the robot 100 may change the representative reaction according to its own structure and output the changed representative reaction.

Figure 6:
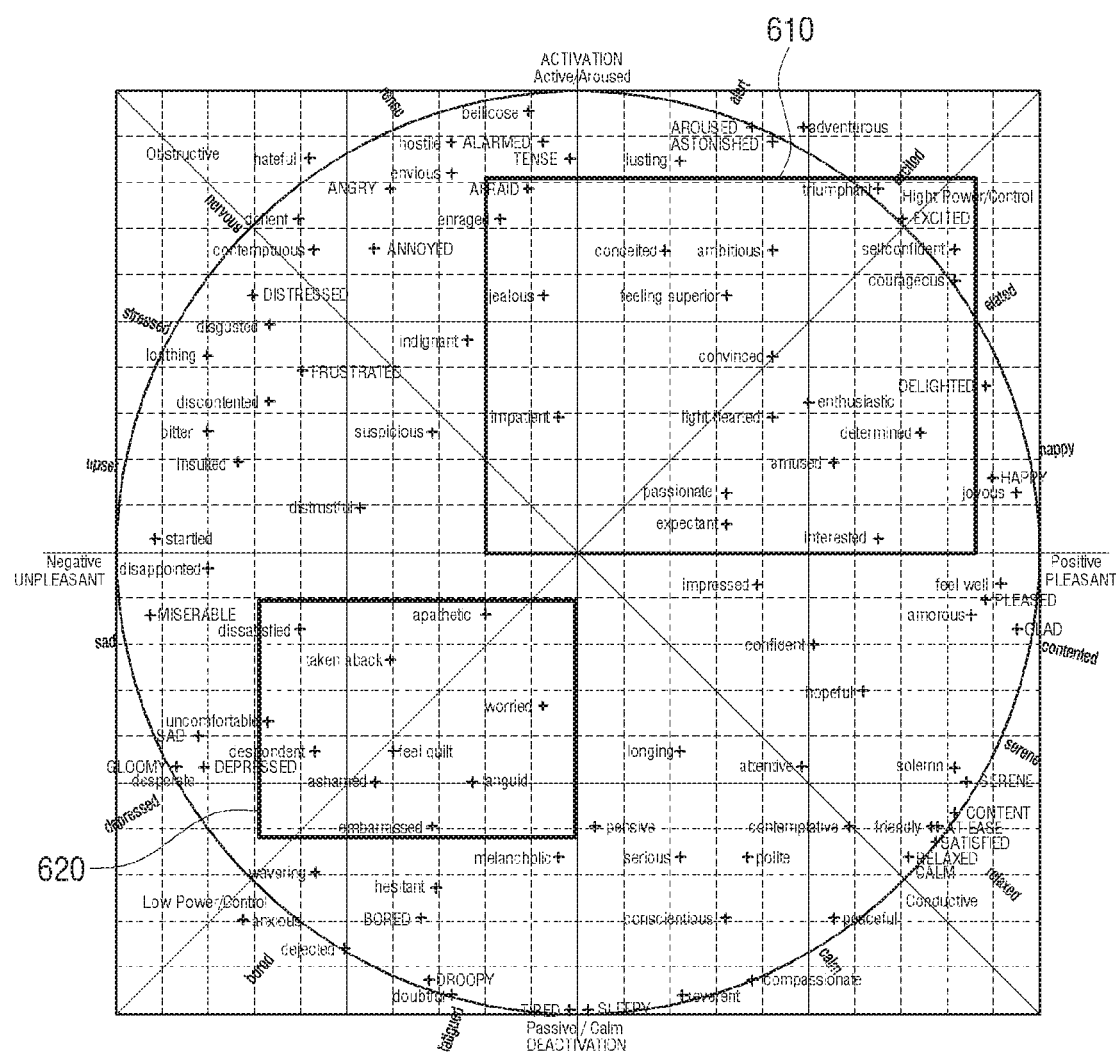
FIG. 6 is an illustrative diagram for describing a method for setting a character of a robot.

FIG. 6 is an illustrative diagram for describing a method for setting a character of a robot.

Specifically, FIG. 6 is an illustrative diagram for describing a method of displaying a character area of the robot 100 in J. Russel's circumplex model. A horizontal axis of J. Russel's circumplex model indicates whether emotion is positive or negative, and a vertical axis indicates activity. In FIG. 6, for convenience of explanation, the character area of the robot 100 is represented on the J. Russel's circumplex model, but is not limited thereto.

As described above, the character of the robot 100 may be set according to the interaction result with the user and the number of interactions with the user. As an example, the character of the robot 100 may vary depending on the number N of interactions with the user, a user reward R, and a service completion rate C. At this time, the number N of interactions refers to the number of times the user and the robot have interacted, the user reward R represents a user's attitude (positive or negative) to the reaction of the robot, and the service completion rate C may be a parameter representing an accuracy of the reaction of the robot to the user data. At this time, when it is assumed that a reference point (e.g., a coordinate of a center of gravity of the character area) of the character area of the robot 100 is ($c_x$, $c_y$), and a width and a height of the character area of the robot 100 are w and h, respectively, the character area of the robot 100 may be determined by N, R, and C.

$$(c_x, c_y, w, h) = f(N, R, C) \quad \text{[Mathematical expression 1]}$$

As an example, $c_x$, $c_y$, w, and h in Mathematical expression 1 may be determined according to Mathematical expression 2 below. At this time, $\alpha, \beta, \gamma, \omega$ may be any real number greater than 0.

$$c_x = \beta(R+C), \ c_y = (\alpha N + R)C, \ w = \gamma N,$$
$$h = \delta N (\alpha, \beta, \gamma, \omega \geq 0) \quad \text{[Mathematical expression 2]}$$

That is, the character area of the robot 100 increases as the number N of interactions with the user increases, and decreases as the number of interactions with the user decreases.

In addition, $c_x$ (a positive or negative degree of emotion) may be determined according to the user reward R and the service completion rate C. That is, the higher the value of the user reward (e.g., praise, scolding, or the like) and service completion rate (e.g., success or failure), the character area of the robot 100 may be set in a right direction. At this time, the meaning that the value of the user reward is high may mean that the robot has received much praise from the user.

In addition, $c_y$ (degree of activity) may be determined according to the number N of user interactions and the user reward R. The more the number of interactions with the user and the more the user praises the robot 100, the character area of the robot 100 may be set in an upper direction.

At this time, the character area of the robot 100 may be updated online or offline. That is, as described in the clustering method, when the character setting of the robot 100 is performed through an external server, the character update of the robot 100 may be performed using either online or offline. For example, when the character update of the robot 100 is performed online, the robot 100 may immediately update the character of the robot 100 whenever the user interaction is input. In this case, when there is a change in the user interaction, the robot 100 may gradually reflect the character area of the robot 100.

Alternatively, when the character update of the robot 100 is performed offline, the robot 100 may update the character of the robot 100 by collecting user interactions for a period of time, and reflecting the collected user interactions at once. At this time, when the character update of the robot 100 is performed offline, the method in which the robot 100 updates the user interaction may be various. For example, the robot 100 may transmit the user data to the external server to update the collected user interactions every a predetermined time, and receive the analyzed results from the server. Alternatively, when a user interaction as much as a predetermined capacity is collected, the robot 100 may transmit the user interaction to the external server to update the user interaction. Alternatively, the robot 100 may transmit the user interaction to the external server to perform the character update of the robot 100 during a period in which the user interaction is not collected or a period in which there is no user. For example, the robot 100 may transmit the user interaction to the external server to perform the character update of the robot 100 at a time when the user is sleeping or when the user goes out.

On the other hand, when the character area of the robot 100 is set by the above-described method, the robot 100 may react based on the set character area. For example, as illustrated in FIG. 6, when the character of the robot 100 corresponds to a first character area 610, the robot 100 may output only a reaction corresponding to emotion corresponding to the first character area 610, and when the character of the robot 100 corresponds to a second character area 620, the robot 100 may output only a reaction corresponding to emotion corresponding to the second character area 620. However, the robot 100 is not limited thereto, and when the character of the robot 100 corresponds to the first character area 610, the robot may output the reaction corresponding to the emotion corresponding to the first character area 610 with a predetermined probability (e.g., 0.9), and output a reaction corresponding to emotion other than the first character area 610 with the remaining probability (e.g., 0.1). The second character area 620 is also as described above.

Meanwhile, in FIG. 6, for convenience of explanation, the case in which the character areas 610 and 620 of the robot 100 have a rectangular shape is described as an example, but the shape of the character areas 610 and 620 is not limited thereto.

Figure 7:
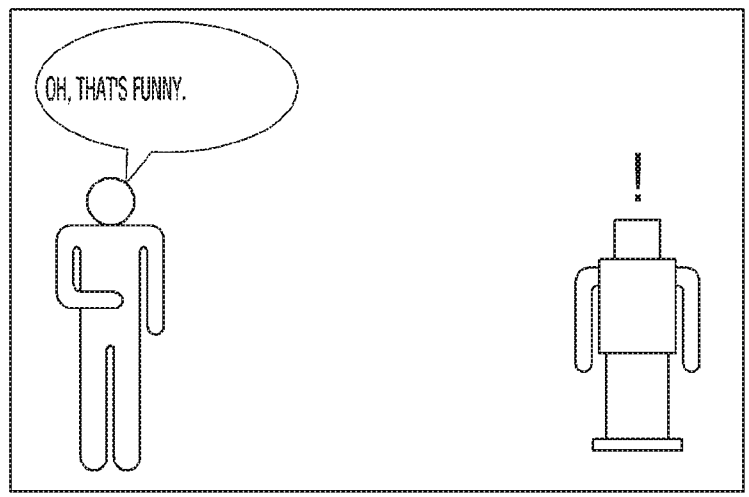
FIG. 7 is an illustrative view for describing a reaction of a robot to user data according to an embodiment of the disclosure.
Figure 7:
Figure 7:
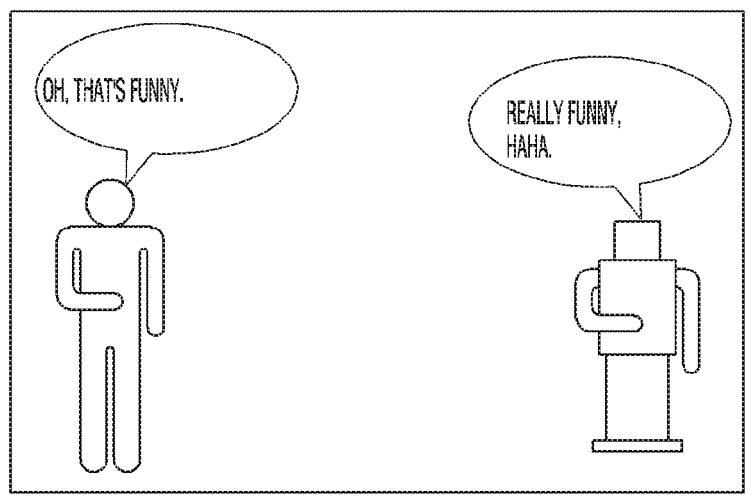

FIG. 7 is an illustrative view for describing a reaction of a robot to user data according to an embodiment of the disclosure.

As illustrated in FIG. 7, when an event in which the user laughs heartily occurs, the robot 100 may cluster user data for the occurred event. At this time, the user data for the event may be included in the "pleasant" cluster.

Thereafter, when the event in which the user laughs heartily occurs again, the robot 100 may determine that the user data for the occurred event corresponds to the 'pleasant' cluster. The robot 100 may perform an operation similar to an operation that laughs heartily according to the representative reaction of the 'pleasant' cluster. At this time, as described with referent to FIG. 5, the robot 100 may perform the operation according to the representative reaction of the 'pleasant' cluster according to the structure of the robot 100. For example, the robot illustrated in FIG. 7 does not have a leg, and may not thus perform an operation related to a leg portion of the representative reaction of the 'pleasant' cluster, or may replace the operation with another operation.

Hereinafter, a method for generating a data recognition model using a learning algorithm, clustering user data through the data recognition model, and then determining a reaction of the robot to the user data, according to an embodiment of the disclosure will be described with reference to FIGS. 8 to 11.

Figure 8:
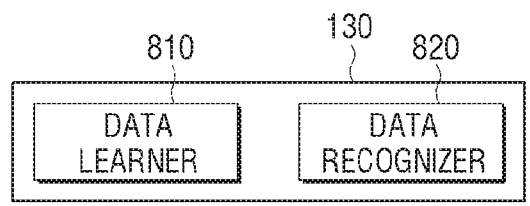
FIGS. 8 to 11 are illustrative diagrams for describing a method for generating a data recognition model using a learning algorithm, clustering user data through the data recognition model, and then determining a reaction of the robot to the user data, according to an embodiment of the disclosure.

Referring to FIG. 8, the processor 130 according to some embodiments may include a data learner 810 and a data recognizer 820.

The data learner 810 may learn a data recognition model to have a criterion for clustering user data. Alternatively, the data learner 810 may learn the data recognition model to have a criterion for determining the reaction of the robot 100 to the user data. The data learner 810 may generate a data recognition model having a determination criterion by applying the user data as learning data to the data recognition model to cluster the user data or determine the reaction of the robot 100 to the user data.

As an example, the data learner 810 may generate or learn the data recognition model by using the various user data described above as the learning data. At this time, the learning data may be an image obtained by capturing the user, a user's voice, skeleton data for the user's image, or user's facial expression data.

The data recognizer 820 may determine a situation by using the user data as recognition data. The data recognizer 820 may determine the situation from predetermined recognition data by using the learned data recognition model. The data recognizer 820 may acquire the predetermined recognition data according to a predetermined criterion, and may determine or estimate the predetermined situation based on the predetermined recognition data by applying the acquired recognition data as an input value to the data recognition model.

In addition, a result value output by applying the acquired recognition data as the input value to the data recognition model may be used to update the data recognition model.

According to an embodiment of the disclosure, the data recognizer 820 may acquire a determination result (a clustering result for the user data or a reaction of the robot 100 to the user data) obtained by determining the situation of the robot 100 by applying recognition data related to voice information and recognition data related to image information as input values to the data recognition model.

At least a portion of the data learner 810 and at least a portion of the data recognizer 820 may be implemented as a software module or manufactured in the form of at least one hardware chip and mounted on the electronic device. For example, at least one of the data learner 810 or the data recognizer 820 may also be manufactured in the form of a dedicated hardware chip for artificial intelligence (AI), or may be manufactured as a portion of an existing general-purpose processor (e.g., CPU or application processor) or a graphic dedicated processor (e.g., GPU) and mounted on a variety of display devices described above. At this time, the dedicated hardware chip for artificial intelligence is a dedicated processor specialized for a probability calculation, and has higher parallel processing performance than the conventional general-purpose processor, and may thus quickly process calculation operations in an artificial intelligence field such as machine learning. When the data learner 810 and the data recognizer 820 are implemented as a software module (or a program module including instructions), the software module may be stored in a non-transitory computer readable media. In this case, the software module may be provided by an operating system (OS), or may be provided by a predetermined application. Alternatively, a portion of the software module may be provided by the OS, and the remaining of the software module may be provided by the predetermined application.

In this case, the data learner 810 and the data recognizer 820 may also be mounted on one robot 100 (or the electronic device), or may also be mounted in each of the separate robots 100 (or electronic devices). For example, one of the data learner 810 and the data recognizer 820 may be included in the robot 100, and the other may be included in an external server. In addition, the data learner 810 and the data recognizer 820 may also provide model information constructed by the data learner 810 to the data recognizer 820 by a wired or wireless line, and the data input to the data recognizer 820 may also be provided to the data learner 810 as additional learning data.

Figure 9:
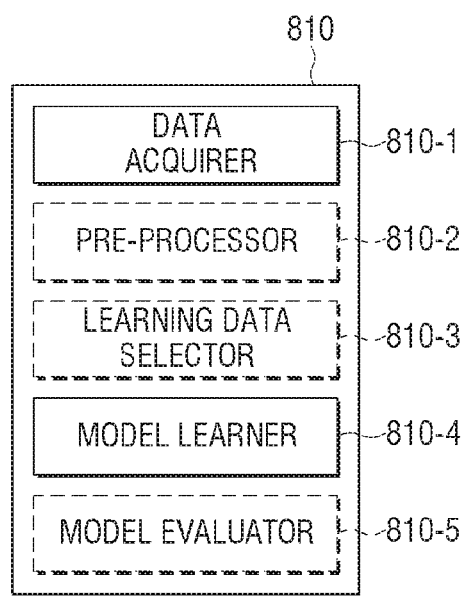

FIG. 9 is a block diagram of the data learner 810 according to an embodiment of the disclosure.

Referring to FIG. 9, the data learner 810 according to some embodiments may include a data acquirer 810-1 and a model learner 810-4. In addition, the data learner 810 may selectively further include at least one of a pre-processor 810-2, a learning data selector 810-3, or a model evaluator 810-5.

The data acquirer 810-1 may acquire the user data as learning data.

As the learning data, data collected or tested by the data learner 810 or a manufacturer of the robot 100 may also be used. Alternatively, the learning data may include voice data generated from natural language spoken by the user through the microphone according to the disclosure. Alternatively, the learning data may include movement data of the user captured by the camera. Alternatively, the learning data may include sensing data detected through various sensors. For example, the learning data may include data on the presence or absence of the user detected through the infrared sensor, include data related to a physical contact with the user detected through the pressure sensor, or include ambient illumination or humidity data detected through the illumination sensor or humidity sensor.

The data learner 810 may further include a pre-processor 810 and a learning data selector 810 to improve a recognition result of the data recognition model or to save resources or time required for generation of the data recognition model.

The pre-processor 810-2 may pre-process the data acquired by the acquirer 810-1.

For example, the pre-processor 810-2 may process the acquired data into a predefined format so that the model learner 810-4 may easily use the data for learning the data recognition model. For example, the pre-processor 810-2 may process the voice data acquired by the data acquirer 810-1 into text data, and may process image data into an image data of a predetermined format. The pre-processed data may be provided to the model learner 810-4 to be described later as the learning data.

In addition, the learning data selector 810-3 may selectively select leaning data necessary for learning from the pre-processed data. The selected learning data may be provided to the model learner 810-4. The learning data selector 810-3 may select learning data necessary for learning from the pre-processed data, according to a predetermined selection criterion. In addition, the learning data selector 810-3 may also select the learning data necessary for learning according to a predetermined selection criterion by learning by the model learner 810-4. As an embodiment of the disclosure, the learning data selector 810-3 may select only the voice data spoken by a specific user among the input voice data, and may select only an area including a person excluding a background among the image data.

The model learner 810-4 may learn the data recognition model used for clustering or determination of the reaction of the robot 100 using the learning data. For example, the model learner 810-4 may learn the data recognition model through supervised learning using at least a portion of the learning data as the determination criterion. Alternatively, the model learner 810-4 may learn the data recognition model through unsupervised learning of finding the determination criterion for determining a situation by performing self-learning using the learning data without any supervision, for example.

In addition, the model learner 810-4 may also learn a selection criterion about which learning data should be used for clustering or determination of the reaction of the robot 100.

The data recognition model may be constructed in consideration of an application field of the recognition model, the purpose of learning, or a performance of the device. The data recognition model may be, for example, a model based on a neural network. The data recognition model may be designed to simulate a human's brain structure on a computer. The data recognition model may include a plurality of network nodes having weights that simulate neurons in a human's neural network. The plurality of network nodes may form a connection relationship so that the neurons simulate synaptic activity through which signals are transmitted and received through synapses. The data recognition model may include, for example, a neural network model or a deep learning model developed from the neural network model. In the deep learning model, the plurality of network nodes may be located at different depths (or layers) and transmit and receive data according to a convolution connection relationship.

For example, as the data recognition model, models such as a deep neural network (DNN), a recurrent neural network (RNN), and a bidirectional recurrent deep neural network (BRDNN) may be used, but the data recognition mode is not limited thereto.

According to diverse embodiments, when there are a plurality of pre-constructed data recognition models, the model learner 810-4 may determine a data recognition model having a high relation between the input learning data and basic learning data as a data recognition model to be learned. In this case, the basic learning data may be pre-classified for each type of data, and the data recognition model may be pre-constructed for each type of data. For example, the basic learning data may be pre-classified by various criteria such as an area in which the learning data is generated, a time at which the learning data is generated, a size of the learning data, a generator of the learning data, and types of objects in the learning data.

In addition, the model learner 810-4 may learn the data recognition model by using a learning algorithm or the like including, for example, error back-propagation or gradient descent.

In addition, the model learner 810-4 may learn the data recognition model through supervised learning using, for example, the determination criterion as the input value. Alternatively, the model learner 810-4 may learn the data recognition model through unsupervised learning of finding the clustering or the determination of the reaction of the robot 100 by performing self-learning using the necessary learning data without any supervision, for example. In addition, the model learner 810-4 may learn the data recognition model through reinforcement learning using a feedback as to whether a result of the clustering or the determination of the reaction of the robot 100 according to the learning is correct, for example.

In addition, when the data recognition model is learned, the model learner 810-4 may store the learned data recognition model. In this case, the model learner 810-4 may store the learned data recognition model in the memory 150 of the robot 100. Alternatively, the model learner 810-4 may store the learned data recognition model in a memory of a server that performs communication with the robot 100 via a wired or wireless network.

The data learner 810 may further include a model evaluator 810-5 to improve the recognition result of the data recognition model.

The model evaluator 810-5 may input evaluation data to the data recognition model, and may cause the model learner 810-4 to learn again when the recognition result outputted from the evaluation data does not satisfy a predetermined criterion. In this case, the evaluation data may be predefined data for evaluating the data recognition model.

For example, when the number or ratio of evaluation data in which the recognition result is not correct among the recognition results of the learned data recognition model for the evaluation data exceeds a predetermined threshold value, the model evaluator 810-5 may evaluate that the predetermined criterion is not satisfied. For example, in a case in which the predetermined criterion is defined as a ratio of 2%, if the learned data recognition model outputs incorrect recognition results for the evaluation data exceeding 20 among a total of 1000 evaluation data, the model evaluator 810-5 may evaluate that the learned data recognition model is not suitable.

Meanwhile, when a plurality of learned data recognition models exist, the model evaluator 810-5 may evaluate whether each of the learned data recognition models satisfies the predetermined criterion, and determine a model satisfying the predetermined criterion as a final data recognition model. In this case, when there are a plurality of models satisfying the predetermined criterion, the model evaluator 810-5 may determine any one or a predetermined number of models previously set in descending order of evaluation score as the final data recognition model.

At least one of the data acquire 810-1, the pre-processor 810-2, the learning data selector 810-3, the model learner 810-4, or the model evaluator 810-5 described above may be implemented as a software module or manufactured in the form of at least one hardware chip and mounted on the electronic device. For example, at least one of the data acquirer 810-1, the pre-processor 810-2, the learning data selector 810-3, the model learner 810-4, or the model evaluator 810-5 may also be manufactured in the form of a dedicated hardware chip for artificial intelligence (AI), or may be manufactured as a portion of an existing general-purpose processor (e.g., CPU or application processor) or a graphic dedicated processor (e.g., GPU) and mounted on a variety of electronic devices described above.

In addition, the data acquirer 810-1, the pre-processor 810-2, the learning data selector 810-3, the model learner 810-4, and the model evaluator 810-5 may also be mounted on one electronic device, or may also be mounted on each of the separate electronic devices. For example, some of the data acquirer 810-1, the pre-processor 810-2, the learning data selector 810-3, the model learner 810-4, and the model evaluator 810-5 may be included in the electronic device, and the remaining may be included in the server.

In addition, at least one of the data acquirer 810-1, the pre-processor 810-2, the learning data selector 810-3, the model learner 810-4, or the model evaluator 810-5 may be implemented as a software module. When at least one of the data acquirer 810-1, the pre-processor 810-2, the learning data selector 810-3, the model learner 810-4, or the model evaluator 810-5 is implemented as the software module (or a program module including instructions), the software module may be stored in a non-transitory computer readable medium. In addition, in this case, at least one software module may be provided by an operating system (OS), or may be provided by a predetermined application. Alternatively, a portion of at least one software module may be provided by the OS, and the remaining of the software module may be provided by the predetermined application.

Figure 10:
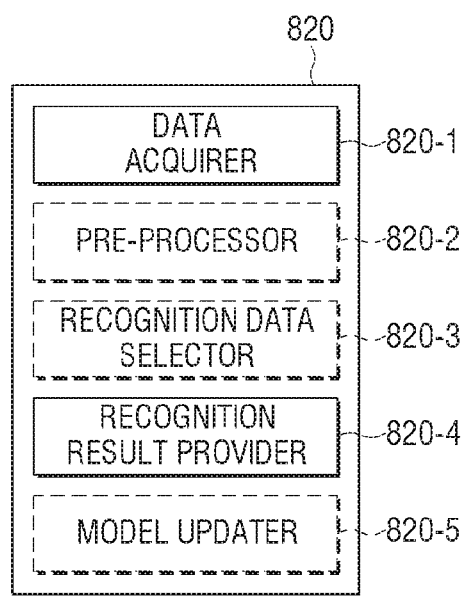

FIG. 10 is a block diagram of the data recognizer 820 according to some embodiments.

Referring to FIG. 10, the data recognizer 820 according to some embodiments may include a data acquirer 820-1 and a recognition result provider 820-4. In addition, the data recognizer 820 may selectively further include at least one of a pre-processor 820-2, a recognition data selector 820-3, or a model updater 820-5.

The data acquirer 820-1 may acquire the user data as recognition data. At this time, the recognition data may include voice data generated from natural language spoken by the user through the microphone according to the disclosure. Alternatively, the recognition data may include movement data of the user captured by the camera. Alternatively, the recognition data may include sensing data detected through various sensors. For example, the recognition data may include data on the presence or absence of the user detected through the infrared sensor, include data related to a physical contact with the user detected through the pressure sensor, or include ambient illumination or humidity data detected through the illumination sensor or humidity sensor.

Meanwhile, the data acquirer 810-1 of the data learner 810 and the data acquirer 820-1 of the data recognizer 820 may be formed of different components, but are not limited thereto. That is, the data acquirer 210-1 of the data learner 810 and the data acquirer 820-1 of the data recognizer 820 may also be formed of one component.

The recognition result provider 820-4 may determine the clustering or the determination of the reaction of the robot 100 by applying the data acquired by the data acquirer 820-1 as an input value to the learned data recognition model. The recognition result provider 820-4 may provide a recognition result according to a recognition purpose of the data. In addition, the recognition result provider 820-4 may provide a recognition result acquired by applying data which is pre-processed by a pre-processor 820-2 to be described later as an input value to the learned data recognition model. In addition, the recognition result provider 820-4 may provide the recognition result by applying data selected by a recognition data selector 820-3 to be described later as an input value to the data recognition model.

The data recognizer 820 may further include a pre-processor 820-2 and a recognition data selector 820-3 to improve the recognition result of the data recognition model or to save resources or time required for providing the recognition result.

The pre-processor 820-2 may pre-process the data acquired by the data acquirer 820-1 for using in recognition for clustering or determination of the reaction of the robot 100.

The pre-processor 820-2 may process the acquired data into a predefined format so that the recognition result provider 820-4 may easily use the data for clustering or determination of the reaction of the robot 100. In particular, according to an embodiment of the disclosure, the data acquire 820-1 may acquire user data (voice data or image data) for clustering or determination of the reaction of the robot 100, and he pre-processor 820-2 may perform the pre-processing into the predefined format as described above.

Meanwhile, the pre-processor 810-2 of the data learner 810 and the pre-processor 820-2 of the data recognizer 820 may be formed of different components, but are not limited thereto. That is, the pre-processor 810-2 of the data learner 810 and the pre-processor 820-2 of the data recognizer 820 may also be formed of one component.

The recognition data selector 820-3 may select recognition data necessary for clustering or determination of the reaction of the robot 100 from the pre-processed data. The selected recognition data may be provided to the recognition result provider 820-4. The recognition data selector 820-3 may select recognition data necessary for clustering or determination of the reaction of the robot 100 from the pre-processed data according to a predetermined selection criterion. In addition, the recognition data selector 820-3 may also select the data according to a predetermined selection criterion by learning by the model learner 810-4 described above.

Meanwhile, the learning data selector 810-3 of the data learner 810 and the learning data selector 820-3 of the data recognizer 820 may be formed of different components, but are not limited thereto. That is, the learning data selector 810-3 of the data learner 810 and the learning data selector 820-3 of the data recognizer 820 may also be formed of one component.

The model updater 820-5 may control the data recognition model to be updated based on the evaluation for the recognition result provided by the recognition result provider 820-4. For example, the model updater 820-5 may control the model learner 810-4 to update the data recognition model by providing the recognition result provided by the recognition result provider 820-4 to the model learner 810-4.

At least one of the data acquire 820-1, the pre-processor 820-2, the recognition data selector 820-3, the recognition result provider 820-4, or the model updater 820-5 in the data recognizer 820 described above may be implemented as a software module or manufactured in the form of at least one hardware chip and mounted on the electronic device. For example, at least one of the data acquirer 820-1, the pre-processor 820-2, the learning data selector 820-3, the recognition result provider 820-4, or the model updater 820-5 may also be manufactured in the form of a dedicated hardware chip for artificial intelligence (AI), or may be manufactured as a portion of an existing general-purpose processor (e.g., CPU or application processor) or a graphic dedicated processor (e.g., GPU) and mounted on a variety of electronic devices described above.

In addition, the data acquire 820-1, the pre-processor 820-2, the recognition data selector 820-3, the recognition result provider 820-4, and the model updater 820-5 may also be mounted on one electronic device, or may also be mounted on each of the separate electronic devices. For example, some of the data acquirer 820-1, the pre-processor 820-2, the recognition data selector 820-3, the recognition result provider 820-4, and the model updater 820-5 may be included in the electronic device, and the remaining may be included in the server.

In addition, at least one of the data acquirer 820-1, the pre-processor 820-2, the recognition data selector 820-3, the recognition result provider 820-4, or the model updater 820-5 may be implemented as a software module. When at least one of the data acquirer 820-1, the pre-processor 820-2, the recognition data selector 820-3, the recognition result provider 820-4, or the model updater 820-5 is implemented as the software module (or a program module including instructions), the software module may be stored in a non-transitory computer readable medium. In addition, in this case, at least one software module may be provided by an operating system (OS), or may be provided by a predetermined application. Alternatively, a portion of at least one software module may be provided by the OS, and the remaining of the software module may be provided by the predetermined application.

Figure 11:
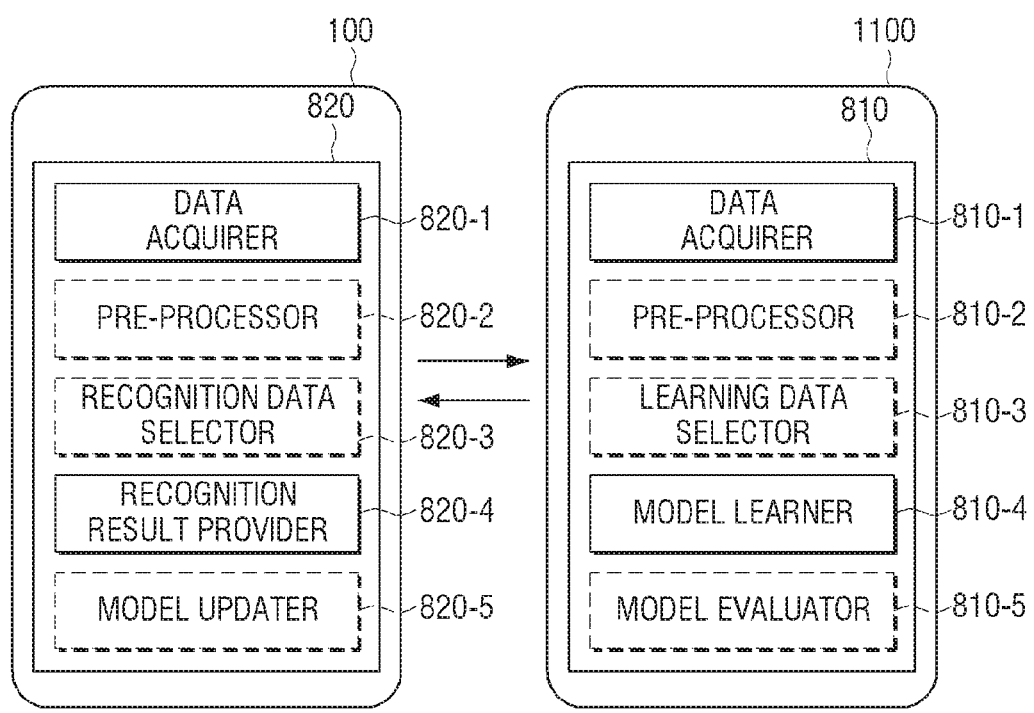

FIG. 11 is a diagram illustrating an example in which the robot 100 and a server 1100 interlock with each other to learn and recognize data, according to an embodiment of the disclosure.

Referring to FIG. 11, the server 1100 may learn a criterion for clustering or determination of the reaction of the robot 100, and the robot 100 may determine the clustering or the determination of the reaction of the robot 100 based on a learning result by the server 100.

In this case, the model learner 810-4 of the server 1100 may learn criteria regarding what data to use to determine the clustering or the determination of the reaction of the robot 100 and regarding how to determine the clustering or the determination of the reaction of the robot 100 using data. The model learner 810-4 may learn the criterion for clustering or determination of the reaction of the robot 100 by acquiring data to be used for learning and applying the acquired data to a data recognition model to be described later.

In addition, the recognition result provider 820-4 of the robot 100 may determine the clustering or the determination of the reaction of the robot 100 by applying the data selected by the recognition data selector 820-3 to the data recognition model generated by the server 1100. Specifically, the recognition result provider 820-4 may request to determine the clustering or the determination of the reaction of the robot 100 by transmitting the data selected by the recognition data selector 820-3 to the server 1100 and applying the data selected by the recognition data selector 820-3 to the recognition model by the server 1100. In addition, the recognition result provider 820-4 may receive information about the clustering or the determination of the reaction of the robot 100 determined by the server 1100 from the server 1100. For example, when the user data is transmitted to the server 1100 by the recognition data selector 820-3, the server 1100 may transmit information on the clustering or the determination of the reaction of the robot 100 to the robot 100 by applying the user data to a pre-stored data recognition model.

Alternatively, the recognition result provider 820-4 of the robot 100 may receive the recognition model generated by the server 1100 from the server 1100, and may determine the clustering or the determination of the reaction of the robot 100 using the received recognition model. In this case, the recognition result provider 820-4 of the robot 100 may determine the clustering or the determination of the reaction of the robot 100 by applying the data selected by the recognition data selector 820-3 to the data recognition model received from the server 1100. For example, the robot 100 may determine the information on the clustering or the determination of the reaction of the robot 100 by receiving and storing the data recognition model from the server 1100 and applying the user data selected by the recognition data selector 820-3 to the data recognition model received from the server 1100.

Figure 12A:
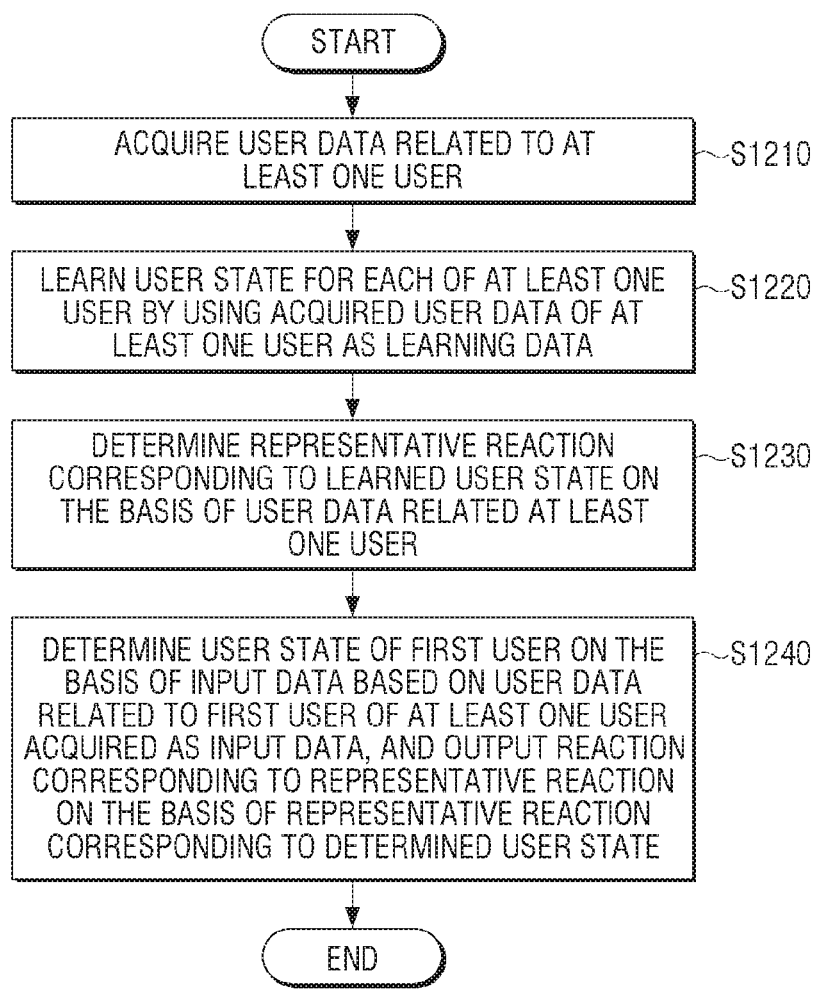
FIGS. 12A and 12B are flowcharts of the robot using the data recognition model according to an embodiment of the disclosure.
Figure 12B:
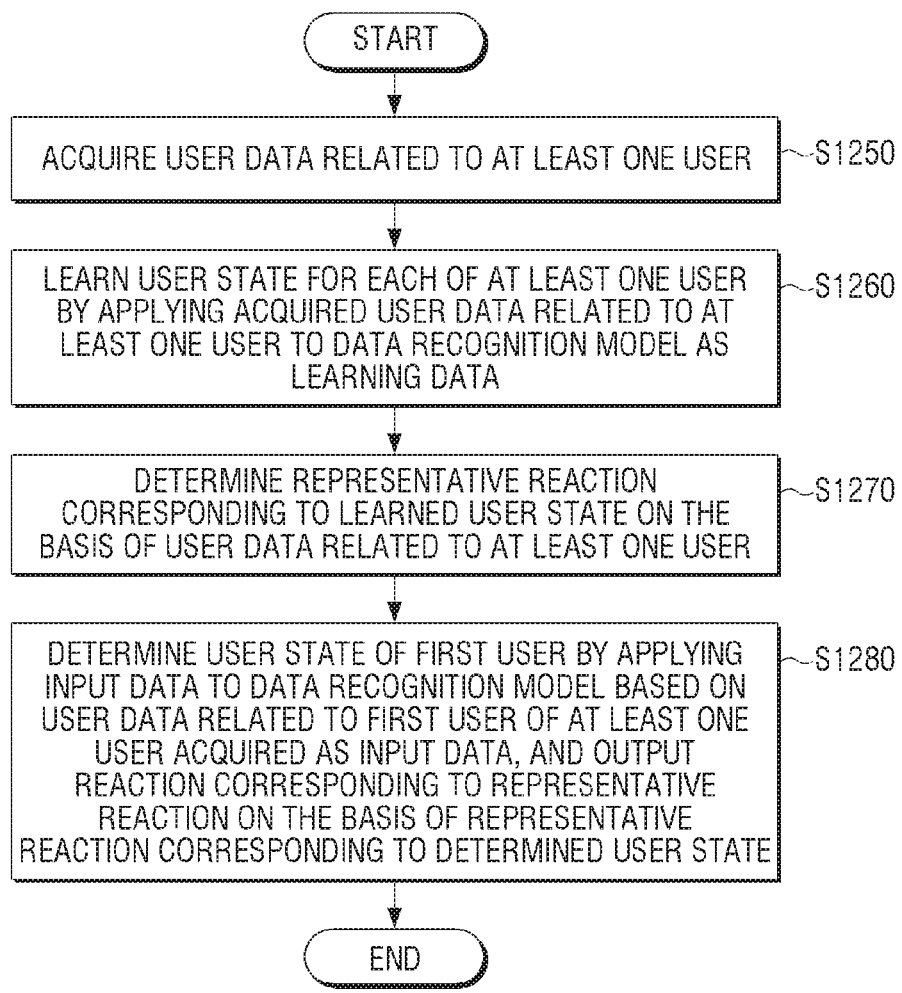

FIGS. 12A and 12B are flowcharts of the robot using the data recognition model according to an embodiment of the disclosure.

First, in FIG. 12A, the robot 100 may acquire user data related to at least one user (S1210). At this time, the user data may include data (user motion, voice, body temperature information, etc.) directly related to the user, as well as data (humidity, illuminance, temperature, or data about other users) related to a user's surrounding environment.

The robot 100 may learn a user state for each of the at least one user by using the at least one acquired user data as learning data (S1220). As an example, the user data may be data corresponding to either user motion or user voice, and the user state may be a user's emotional state. At this time, the learned user state may be the clustered user state as described above.

Meanwhile, the robot 100 may determine a representative reaction corresponding to the learned user state on the basis of the user data related to the at least one user (S1230). As an example, the robot 100 may determine the representative reaction corresponding to the user emotion on the basis of at least one of the user motion or the user voice. Specifically, the robot 100 may determine a representative reaction for each of at least one generated cluster. That is, when the representative reaction is a representative motion related to the user motion, the robot 100 may acquire skeleton data for one user data among the user data included in the cluster, and acquire a motion corresponding to the acquired skeleton data as a representative motion of the corresponding cluster. Alternatively, when the representative reaction is a representative voice related to the user voice, the robot 100 may acquire audio data for one user data among the user data included in the cluster, and acquire a voice corresponding to the acquired audio data as a representative voice of the corresponding cluster.

When user data related to a first user among the at least one user is acquired as input data, the robot 100 may determine a user state of the first user on the basis of the input data, and output a reaction corresponding to a representative reaction on the basis of the representative reaction corresponding to the determined user state (S1240). At this time, the reaction output by the robot 100 may be various, such as a motion, a voice, a facial expression, and an information transfer. At this time, the robot 100 may output the same reaction as the representative reaction corresponding to the user state. Alternatively, when the robot 100 may not output the same reaction as the representative reaction corresponding to the user state due to the structure of the robot 100, the robot 100 may output only a portion that may be mimicked by the robot 100 among representative reactions corresponding to the user state according to the structure of the robot 100.

Meanwhile, as illustrated in FIG. 12B, the robot 100 according to the disclosure may perform the operation of FIG. 12A using an artificial intelligence model. Specifically, as illustrated in FIG. 12B, the robot 100 may acquire user data related to at least one user (S1250). At this time, the user data may include data (user motion, voice, biometric information, etc.) directly related to the user, as well as data (humidity, illuminance, temperature, or data about other users) related to a user's surrounding environment.

The robot 100 may learn a user state for each of the at least one user by applying the acquired user data related to the at least one user as learning data to a data recognition model (S1260). As an example, the user data may be data corresponding to either user motion or user voice, and the user state may be a user's emotional state. At this time, the learned user state may be the clustered user state as described above.

Meanwhile, the robot 100 may determine a representative reaction corresponding to the learned user state on the basis of the user data related to the at least one user (S1270). As an example, the robot 100 may determine a representative reaction corresponding to the user emotion on the basis of at least one of the user motion or the user voice. Specifically, the robot 100 may determine a representative reaction for each of at least one generated cluster. That is, when the representative reaction is a representative motion related to the user motion, the robot 100 may acquire skeleton data for one user data among the user data included in the cluster, and acquire a motion corresponding to the acquired skeleton data as a representative motion of the corresponding cluster. Alternatively, when the representative reaction is a representative voice related to the user voice, the robot 100 may acquire audio data for one user data among the user data included in the cluster, and acquire a voice corresponding to the acquired audio data as a representative voice of the corresponding cluster.

When user data related to a first user among the at least one user is acquired as input data, the robot 100 may determine a user state of the first user by applying the input data to the data recognition model, and output a reaction corresponding to a representative reaction on the basis of the representative reaction corresponding to the determined user state (S1280). At this time, the reaction output by the robot 100 may be various, such as a motion, a voice, an expression, and an information transfer. At this time, the robot 100 may output the same reaction as the representative reaction corresponding to the user state. Alternatively, when the robot 100 may not output the same reaction as the representative reaction corresponding to the user state due to the structure of the robot 100, the robot 100 may output only a portion that may be mimicked by the robot 100 among representative reactions corresponding to the user state according to the structure of the robot 100.

Figure 13A:
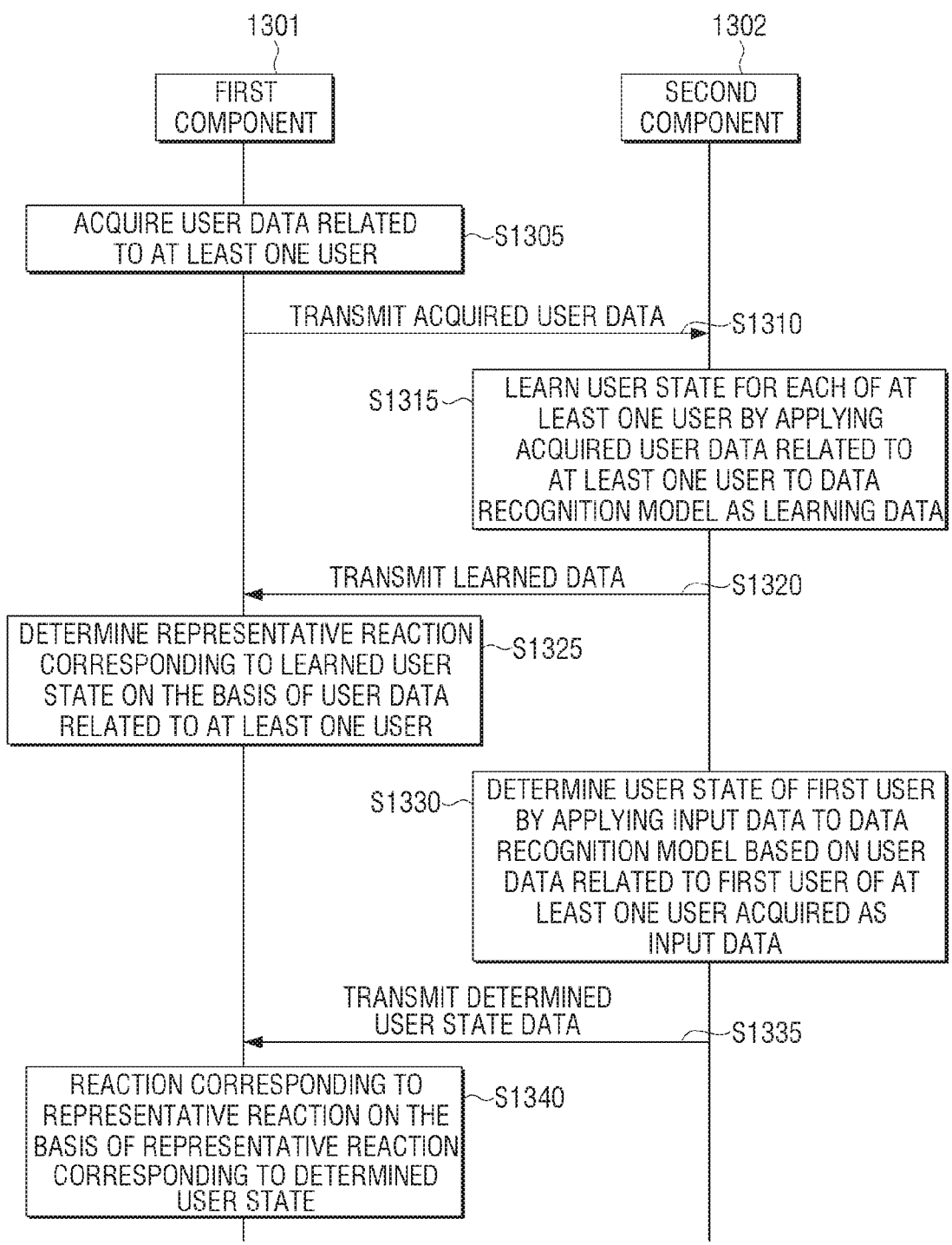
FIGS. 13A and 13B are flowcharts of a network system using the data recognition model according to an embodiment of the disclosure.
Figure 13B:
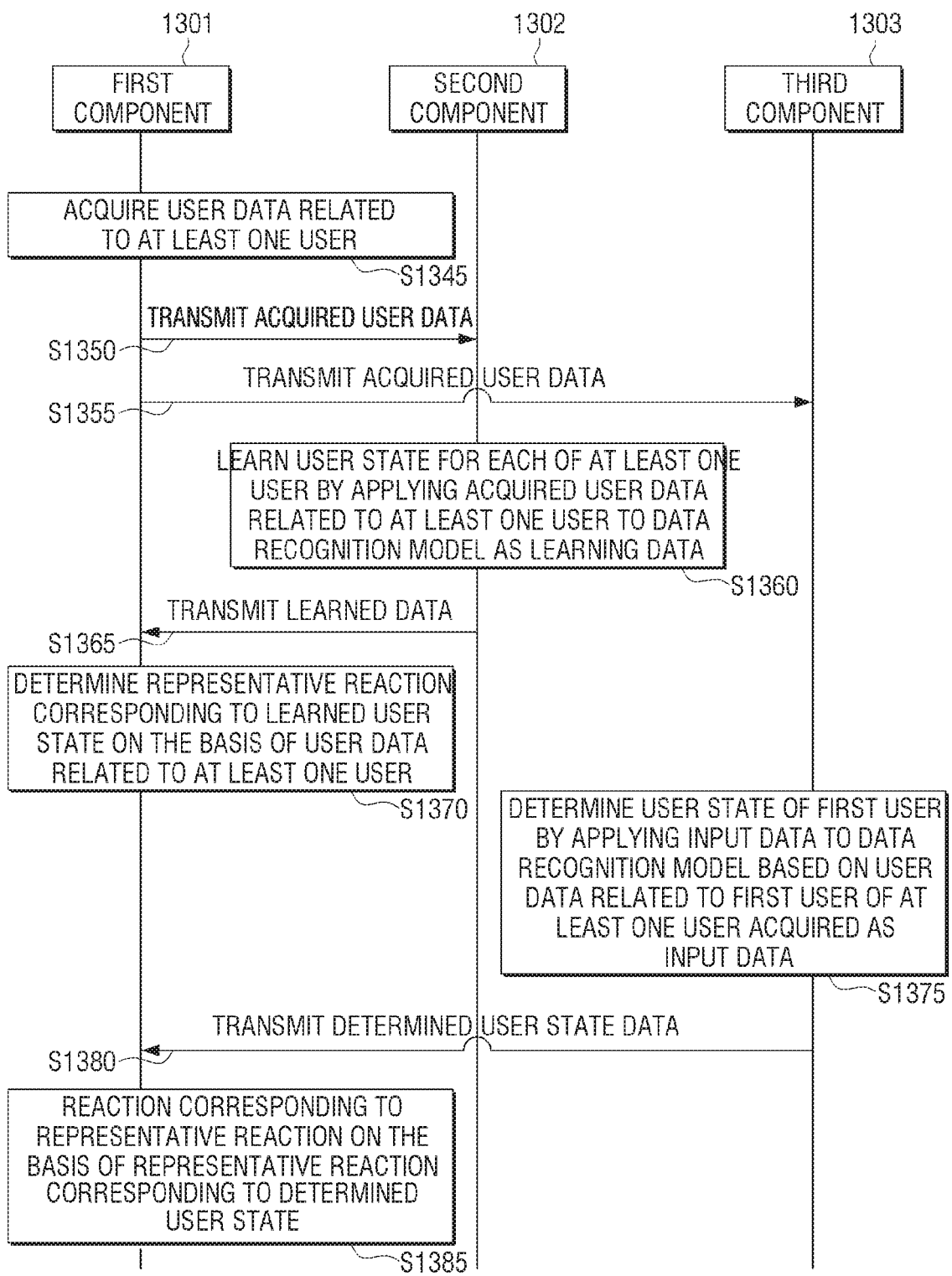

FIGS. 13A and 13B are flowcharts of a network system using the data recognition model according to an embodiment of the disclosure.

In FIGS. 13A and 13B, a network system using the data recognition model may include a first component 1301, a second component 1302, and a third component 1303.

As an example, the first component 1301 may be the robot 100, and the second component 1302 may be the server 1100 in which the data recognition model is stored. At this time, the third component 1303 may be another server in which a data recognition model separate from the server 1100 is stored. Alternatively, the first component 1301 may be a general-purpose processor, and the second component 1302 and the third component 1303 may be an artificial intelligence dedicated processor. Alternatively, the first component 1301 may be at least one application, and the second component 1302 and the third component 1303 may be an operating system (OS). That is, the second component 1302 and the third component 1303 are components that are more integrated, dedicated, have dominated performance, or have more resources than the first component 1301, and may be components capable of processing many calculations that are required at the time of generating, updating, or applying the data recognition model faster and more efficiently than the first component 1301.

In this case, an interface for transmitting/receiving data between the first component 1301, the second component 1302, and the third component 1303 may be defined.

As an example, an application program interface (API) having learning data to be applied to the data recognition model as an argument value (or an intermediate value or a transfer value) may be defined. The API may be defined as a set of subroutines or functions that may be called for any processing of another protocol (e.g., a protocol defined in the server 1100) in any one protocol (e.g., a protocol defined in the robot 100). That is, an environment in which an operation of another protocol may be performed in any one protocol through the API may be provided.

According to an embodiment of the disclosure, as illustrated in FIG. 13A, the first component 1301 may acquire user data related to at least one user (S1305).

The first component 1301 may transmit the acquired user data to the second component 1302 (S1310). For example, when the first component 1301 calls an API function and inputs information on the user data as a data argument value, the API function may transmit the information on the user data to the second component 1302 as recognition data to be applied to the data recognition model.

The second component 1302 may learn a user state for each of the at least one user by applying the acquired user data related to the at least one user as learning data to the data recognition model (S1315). In this case, the meaning of learning the user state may mean classifying and clustering the learning data.

The second component 1302 may transmit the learned data to the first component 1301 (S1320).

The first component 1301 may determine a representative reaction corresponding to the learned user state on the basis of the user data related to the at least one user (S1325). Specifically, the robot 100 may determine a representative reaction for each of at least one generated cluster. That is, when the representative reaction is a representative motion related to the user motion, the robot 100 may acquire skeleton data for one user data among the user data included in the cluster, and acquire a motion corresponding to the acquired skeleton data as a representative motion of the corresponding cluster. Alternatively, when the representative reaction is a representative voice related to the user voice, the robot 100 may acquire audio data for one user data among the user data included in the cluster, and acquire a voice corresponding to the acquired audio data as a representative voice of the corresponding cluster.

On the other hand, independently of the S1320 and S1325, when the user data related to the first user among at least one user is acquired as the input data, the second component 1302 may determine the user state of the first user by applying the input data to the data recognition model (S1330). At this time, the input data may be the user data related to at least one user acquired in S1305.

The second component 1302 may transmit the user state data determined in S1330 to the first component 1301 (S1335), and the first component 1301 may output a reaction corresponding to the representative reaction on the basis of the representative reaction corresponding to the determined user state (S1340).

Meanwhile, the operation of the second component 1302 in FIG. 13A may include the operation of the second component 1302 and the operation of the third component 1303 in FIG. 13B. That is, in FIG. 13A, the second component 1302 is configured as one server to perform all operations, but in FIG. 13B, the operation of the second component 1302 and the third component 1303 are configured as separate independent servers to perform the operations.

Specifically, as illustrated in FIG. 13B, the first component 1301 may acquire user data related to at least one user (S1345).

The first component 1301 may transmit the acquired user data to the second component 1302 (S1350). In addition, the first component 1301 may transmit the acquired user data to the third component 1303 (S1355).

The second component 1302 may learn a user state for each of the at least one user by applying the acquired user data related to the at least one user as learning data to the data recognition model (S1360). In this case, the meaning of learning the user state may mean classifying and clustering the learning data.

The second component 1302 may transmit the learned data to the first component 1301 (S1365).

The first component 1301 may determine a representative reaction corresponding to the learned user state on the basis of data related to the at least one user (S1370). Specifically, the robot 100 may determine a representative reaction for each of at least one generated cluster. That is, when the representative reaction is a representative motion related to the user motion, the robot 100 may acquire skeleton data for one user data among the user data included in the cluster, and acquire a motion corresponding to the acquired skeleton data as a representative motion of the corresponding cluster. Alternatively, when the representative reaction is a representative voice related to the user voice, the robot 100 may acquire audio data for one user data among the user data included in the cluster, and acquire a voice corresponding to the acquired audio data as a representative voice of the corresponding cluster.

On the other hand, when the user data related to the first user among at least one user is acquired as the input data, the third component 1303 may determine the user state of the first user by applying the input data to the data recognition model (S1375). At this time, the input data may be the user data related to at least one user acquired in S1345.

The third component 1303 may transmit the user state data determined in S1375 to the first component 1301 (S1380), and the first component 1301 may output a reaction corresponding to the representative reaction on the basis of the representative reaction corresponding to the determined user state (S1385).

Hereinafter, diverse embodiments of the disclosure will be described with reference to FIGS. 14A to 17B.

In the above-described embodiment, the process in which the robot 100 performs the operation corresponding to the user data has been mainly described, but the robot 100 may output various reactions to the user data in addition to performing the operation corresponding to the user data.

Specifically, the robot 100 may learn the data recognition model to acquire the user state by inputting the user data into the data recognition model as learning data. When the user data is applied to the learned data recognition model as input data, the robot 100 may determine a reaction to be output with respect to the input data.

For example, the user data may be learning data including a user behavior or a user's facial expression, and the user state may be a user habit. In this case, the robot 100 may acquire information on the user habit by analyzing the user data. Specifically, the robot 100 may learn the data recognition model to acquire the information on the user habit by inputting the user data including the user behavior or facial expression into the data recognition model as the learning data. When the data for the user habit is applied to the data recognition model as input data, the learned robot 100 may determine a reaction to be output with respect to the input data.

Figure 14A:
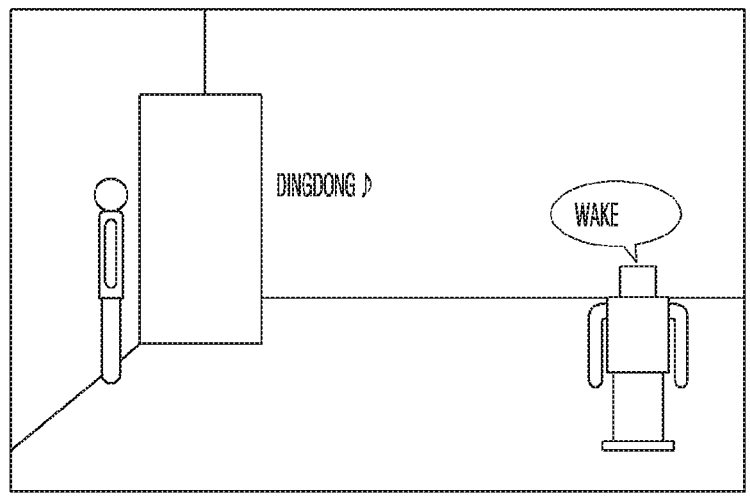
FIGS. 14A to 18B are illustrative diagrams for describing diverse embodiments of the disclosure.
Figure 14A:
Figure 14A:
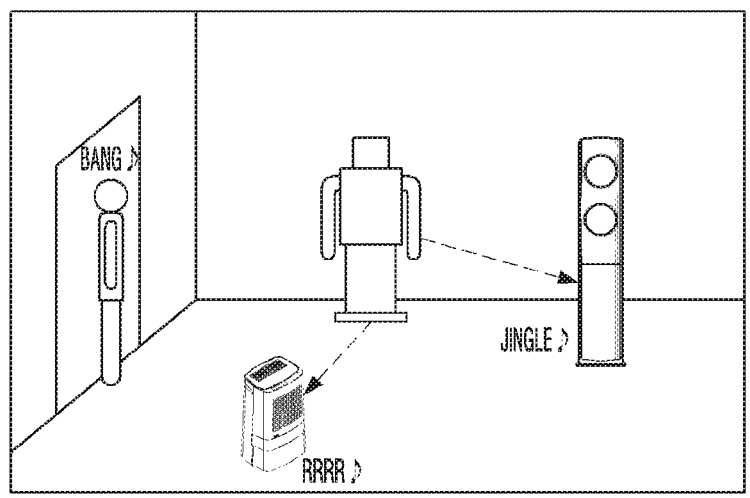

As an example, as illustrated in FIG. 14A, if a user has a habit of turning on particular user's peripherals (e.g., an air purifier and an air conditioner) when returning home after going out, the robot 100 may learn the user's habit. When the data for the user habit is applied to the learned data recognition model as input data, the learned robot 100 may determine a reaction to be output with respect to the input data. For example, the learned robot 100 may turn on the air purifier and the air conditioner itself when the user returns home after going out. At this time, the robot 100 may control the air purifier and the air conditioner in consideration of user's surrounding information (e.g., current temperature, season, humidity, etc.).

Figure 14B:
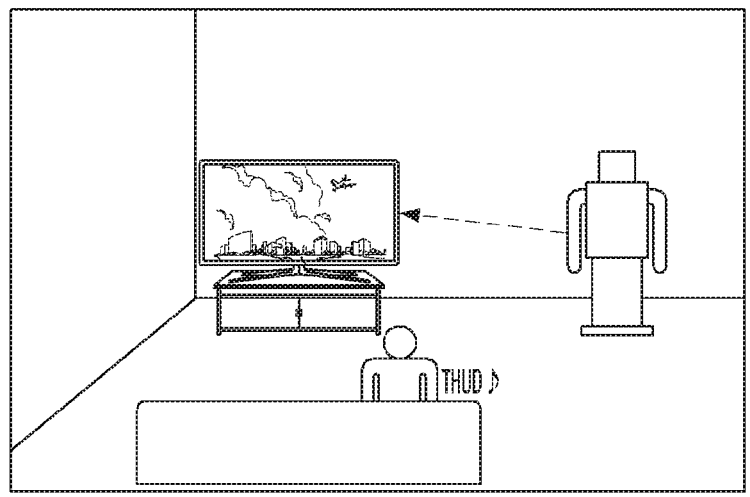
Figure 14B:
Figure 14B:
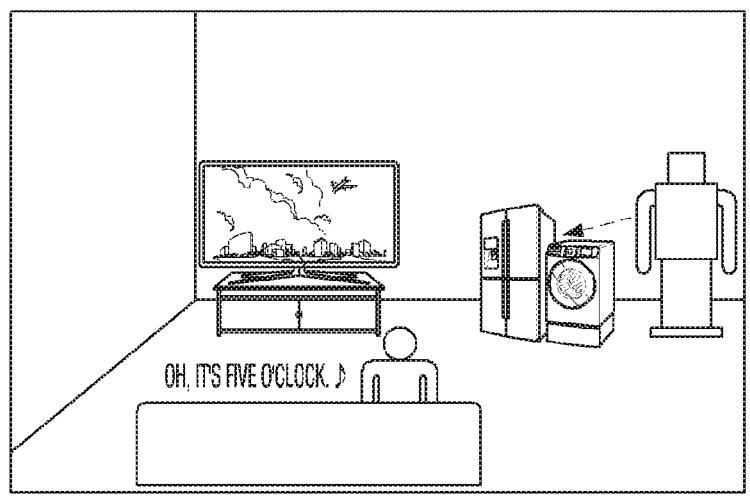

As another example, as illustrated in FIG. 14B, if a user has a habit of turning on a TV when sitting on a couch, or has a habit of performing a specific action (e.g., housework) at a specific time (e.g., 5 o'clock), the robot 100 may learn the user's habit. When the data for the user habit is applied to the learned data recognition model as input data, the learned robot 100 may determine a reaction to be output with respect to the input data. For example, the learned robot 100 may turn on the TV when the user sits on the couch. Alternatively, at five o'clock, the robot 100 may do the housework before the user does the housework.

Figure 14C:
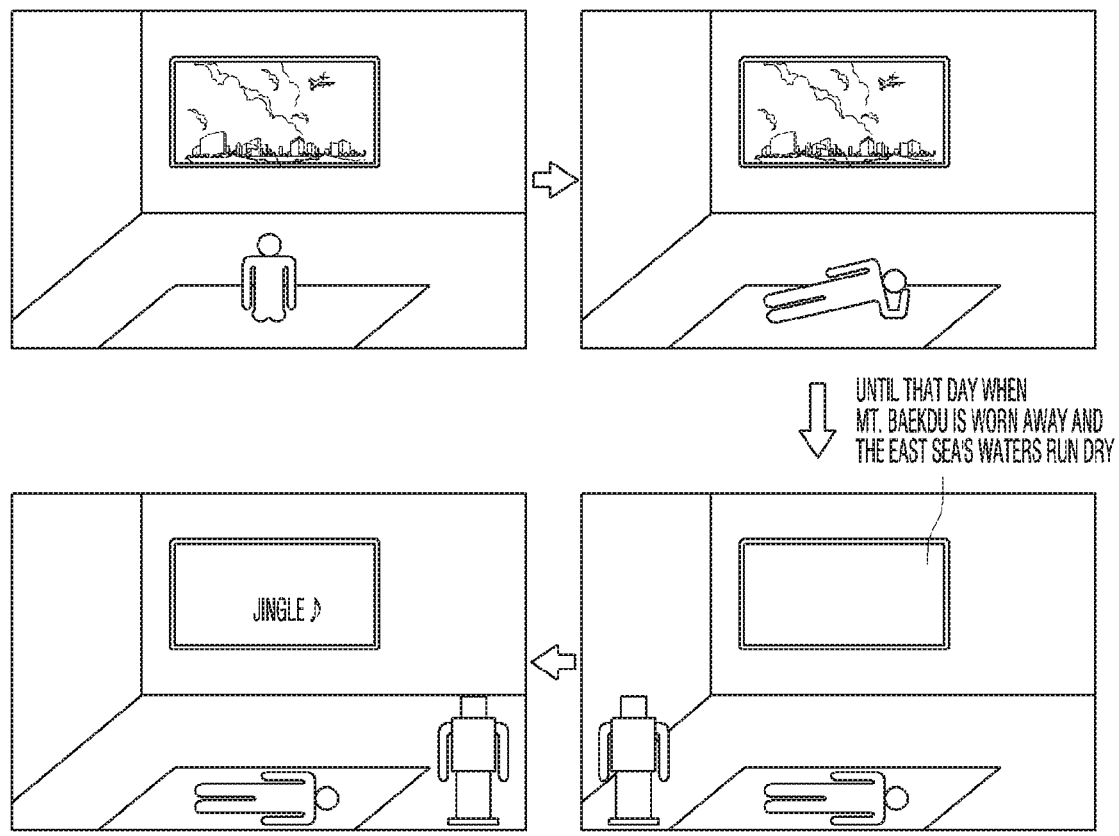

As still another example, as illustrated in FIG. 14C, if the user has a habit of turning off the TV before going to sleep, the robot 100 may learn the user's habit. The learned robot 100 may turn off the TV when the user falls asleep while watching TV.

As still another example, the robot 100 may analyze user data for a user's interests and knowledge level and have a conversation with the user.

Figure 15A:
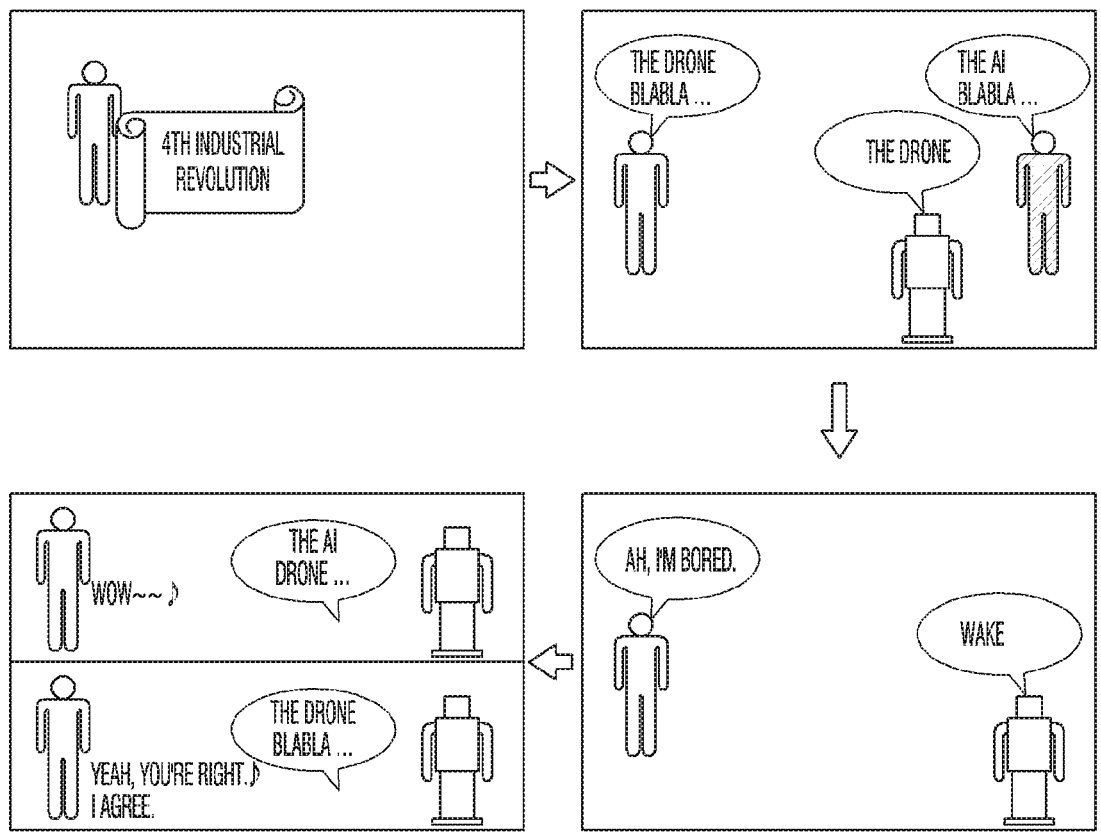

For example, as illustrated in FIG. 15A, when the user has a conversation with another user about AI or drone, the robot 100 may acquire information on a user's interest field on the basis of voice data included in the user's conversation as the user data. Specifically, the robot 100 may learn the data recognition model to acquire the information on the user' interest field by inputting the voice data included in the user's conversation into the data recognition model as input data.

When the data for the user's interests and knowledge level is applied to the data recognition model as the input data, the robot 100 may determine a reaction to be output with respect to the input data. For example, the learned robot 100 may have a conversation with the user on the subject of AI, drone, and the like on the basis of the learned data, for example, when the user is determined to be bored. At this time, the robot 100 may proceed with the conversation according to a user's intellectual level. That is, the robot 100 may analyze the user's intellectual level from the user's conversation data, and may have a conversation with the user with content corresponding to the user's intellectual level.

Figure 15B:
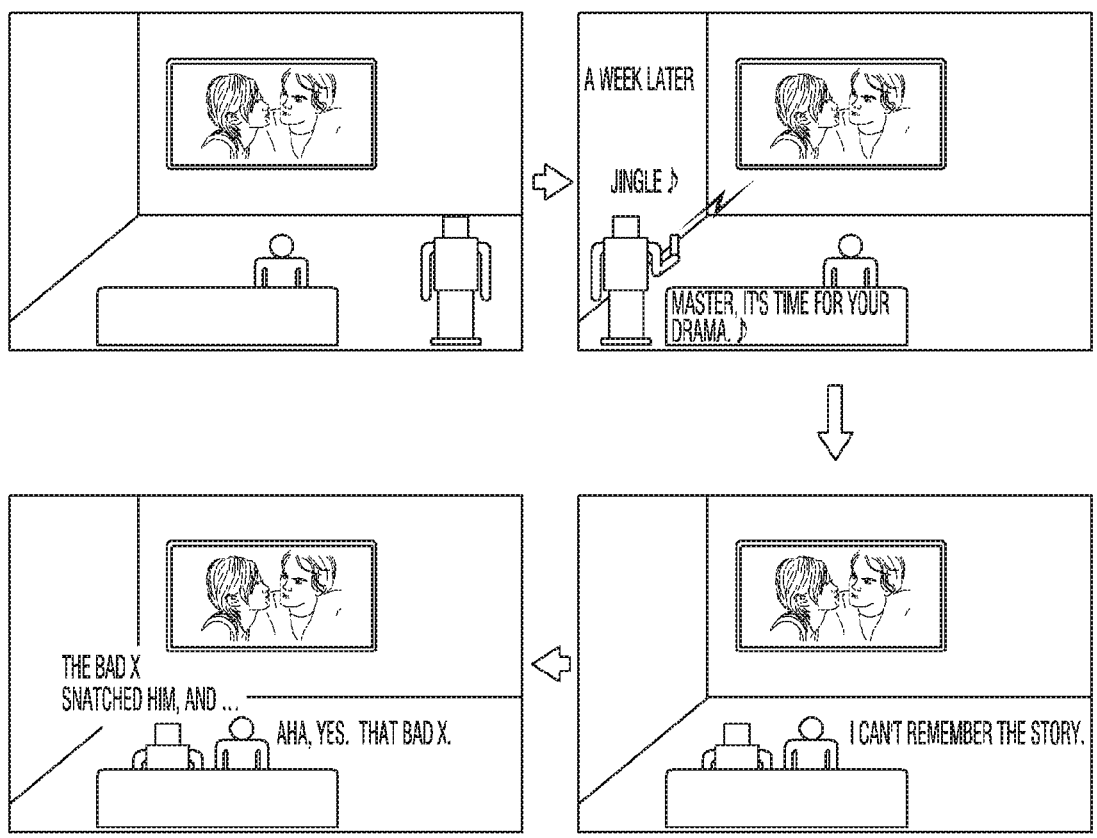

As still another example, as illustrated in FIG. 15B, when the user is watching content (e.g., a drama), the robot 100 may acquire information on the user's interest field on the basis of the content that the user is watching, as the user data. In this case, the robot 100 may learn the content itself (i.e., video and audio output through a TV) that the user is watching, or may also learn the content by using data about the content that the user is watching (that is, receiving data related to content such as an electronic program guide (EPG) from a server in which the content is stored). Thereafter, when the user is watching the next episode of the watched content, the user may not be able to remember the content of the previously watched content. At this time, the robot 100 may have a conversation with the user on a subject that the user does not remember.

As still another example, the robot 100 may output different reactions in the same or similar situation depending on an interaction with the user.

Figure 16A:
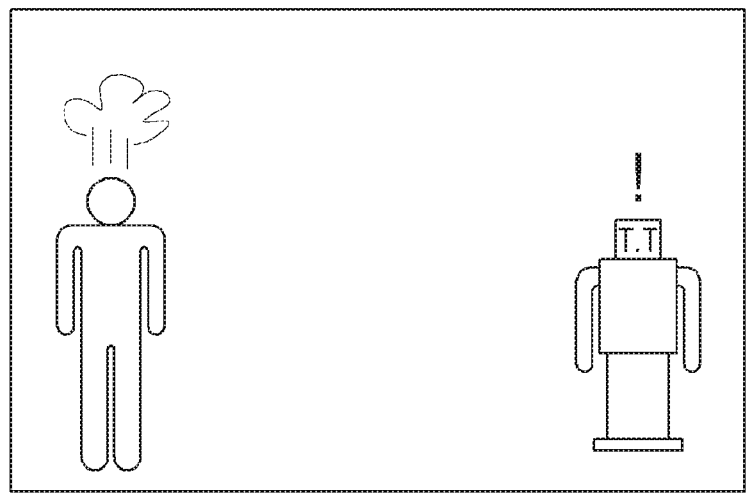
Figure 16A:
Figure 16A:
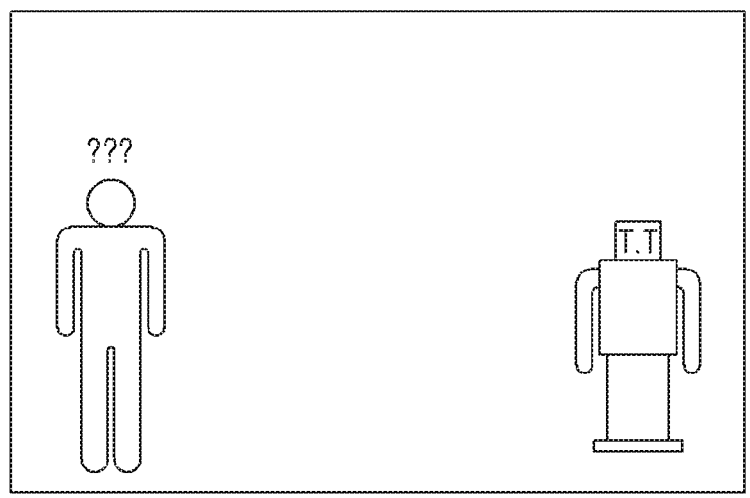

For example, as described with reference to FIG. 7, the robot 100 may output different reactions to the same or similar situation depending on the character of the robot 100 formed according to the user interaction. Specifically, the robot 100 may learn the data recognition model to acquire the character of the robot according to the user data by inputting data on the number N of interactions with the user, user reward R, and service completion rate C into the data recognition model as the user data. Specifically, as illustrated in FIG. 16A, the robot 100 may learn the data recognition model to acquire the user state by inputting data on a behavior that the user is angry with the robot itself into the data recognition model as the user data. When the user data is applied to the learned data recognition model as input data, the robot 100 may determine a reaction to be output with respect to the input data. For example, when the user is usually angry with the robot 100 a lot, the robot 100 may acquire a timid character on the basis of on the user data. When the user data for the number N of interactions with the user, the user reward, and the service completion rate C is input to the data recognition model as the input data, the learned robot 100 may determine a reaction to be output with respect to the input data. For example, when the user asks a question to the robot 100, which has been carefully learned, the robot 100 may provide only minimal information about the user's question.

Figure 16B:
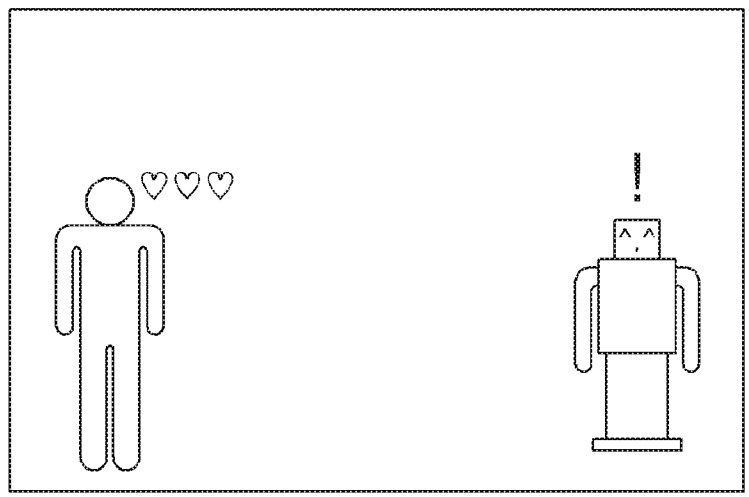
Figure 16B:
Figure 16B:
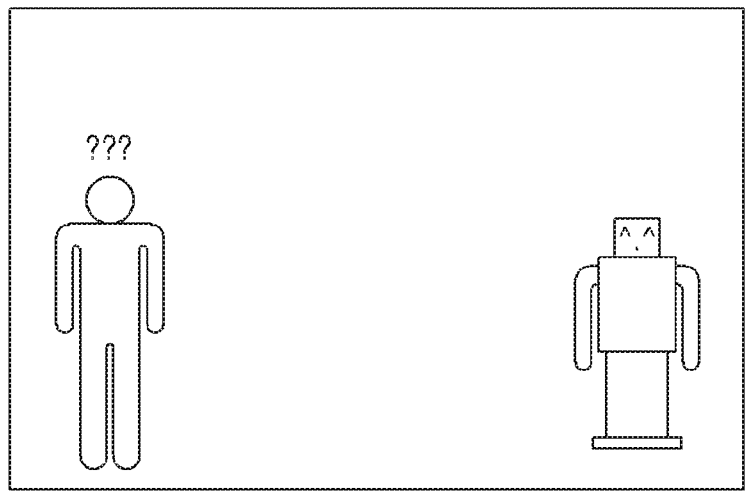

Alternatively, as illustrated in FIG. 16B, when the user usually devotes much affection to the robot 100, the robot 100 may acquire a confident character on the basis of on the user data. When the user data for the number N of interactions with the user, the user reward R, and the service completion rate C is input to the data recognition model as the input data, the learned robot 100 may determine a reaction to be output with respect to the input data. For example, when the user asks a question to the confident robot 100, the robot 100 may provide various related information beyond providing information about the user's question.

As still another example, the robot 100 may learn the data recognition model to acquire the user state by inputting user data related to a user's schedule into the data recognition model as learning data. When the user data is applied to the learned data recognition model as input data, the robot 100 may determine a reaction to be output with respect to the input data. For example, the robot 100 may learn user data related to the user's schedule and provide a schedule to the user.

Figure 17A:
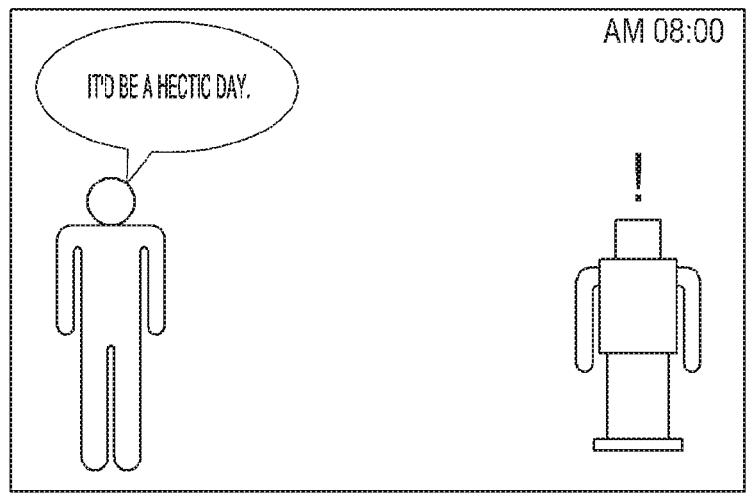
Figure 17A:
Figure 17A:
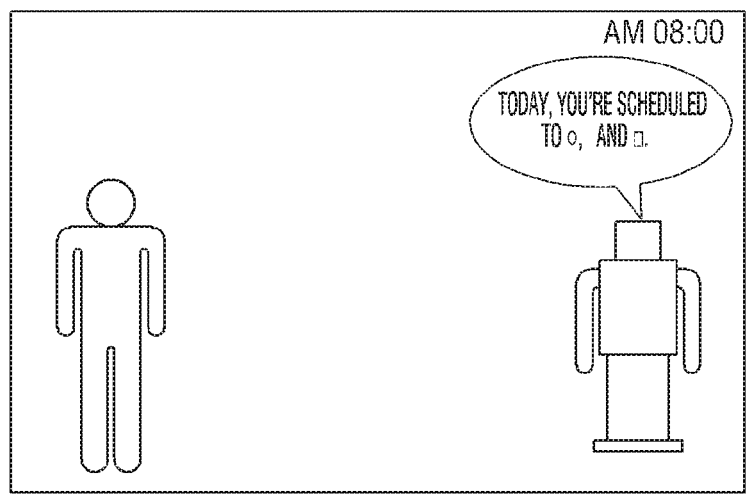

For example, as illustrated in FIG. 17A, when the user hurriedly leaves home around 08:00 every morning, the robot 100 may learn the user state by inputting the user's schedule (leave the house at 08:00 in the morning) and a user's emotional state (busy, impatient, etc.) into the data recognition model as learning data. When the data for the user's schedule is applied to the data recognition model as input data, the learned robot 100 may determine a reaction to be output with respect to the input data. For example, the learned robot 100 may provide information related to the user's schedule of the day to the user on the basis of the learned user's schedule and user's emotional state.

Figure 17B:
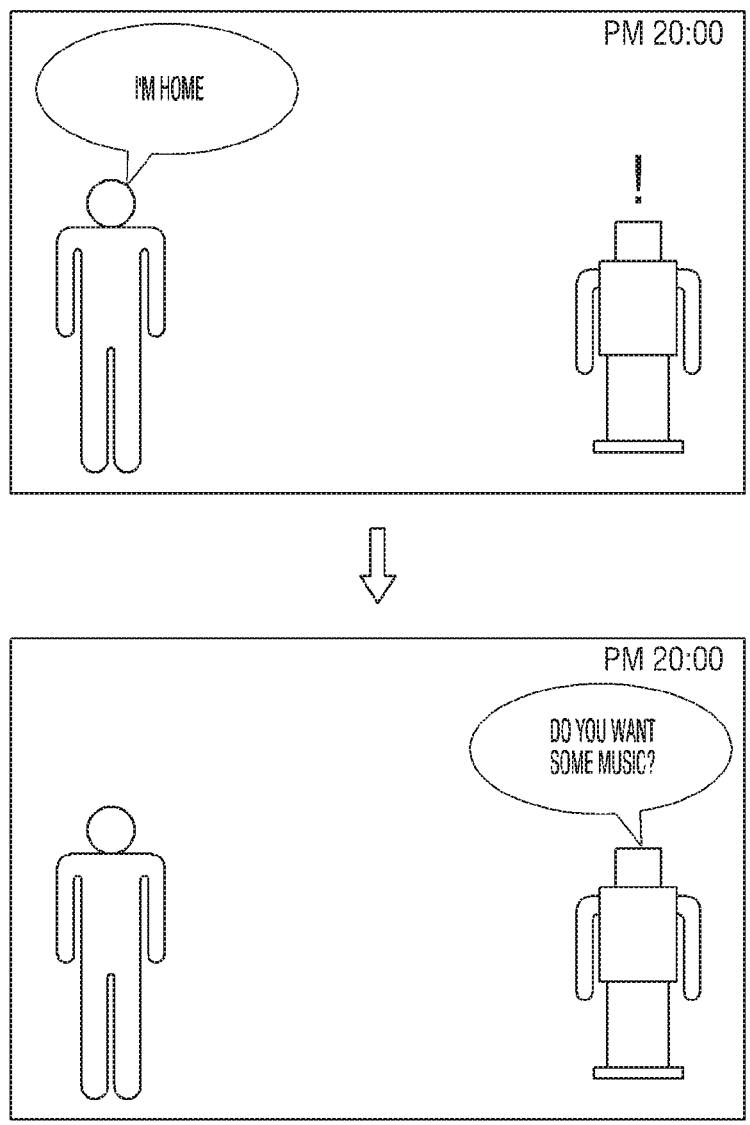

Alternatively, as illustrated in FIG. 17B, when the user returns to home around 08:00 every evening and gets tired, the robot 100 may learn the user state by inputting the user's schedule (returning to home at 08:00 in the evening) and the user's emotional state (fatigue, tiredness, etc.) into the data recognition model as learning data. The robot 100 may provide a user's favorite music or content to the user on the basis of the learned user's schedule and user's emotional state.

As still another example, the robot 100 may learn a relationship between a user (owner) and other users and output various reactions to other users. Specifically, the robot 100 may learn the data recognition model to acquire a user state (a user state related to the relationship with other users) by inputting user data related to the relationship between the user (owner) and other users into the data recognition model as learning data. When the user data is applied to the learned data recognition model as input data, the robot 100 may determine a reaction to be output with respect to the input data.

Figure 18A:
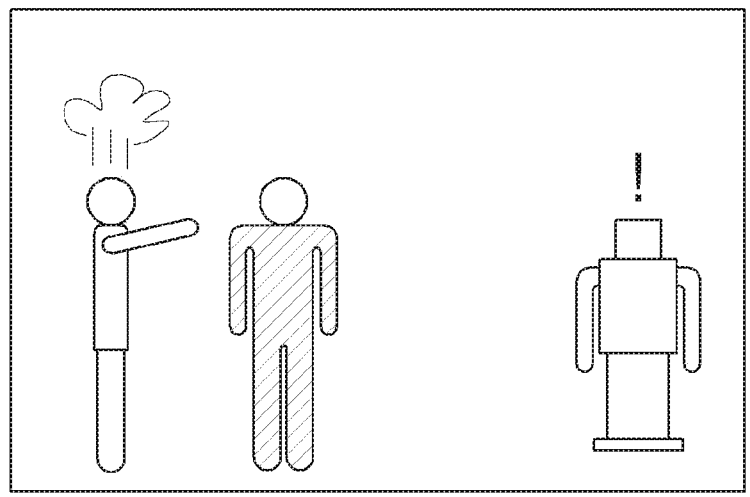
Figure 18A:
Figure 18A:
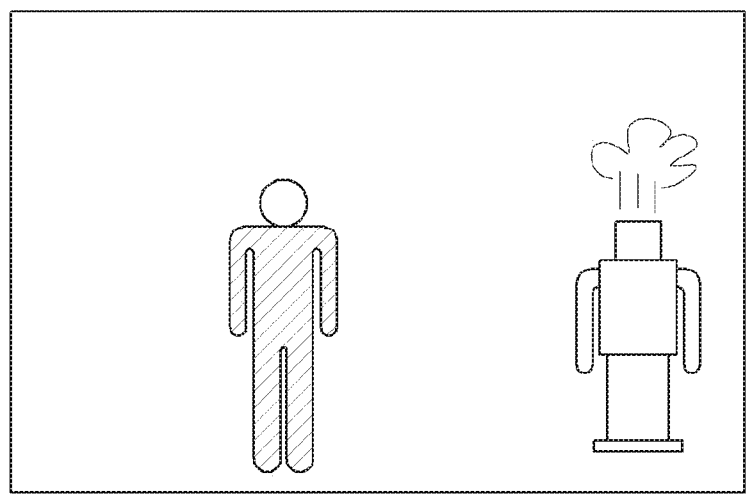

For example, as illustrated in FIG. 18A, when the user (owner) is always angry with other users, the robot 100 may learn a user state for an attitude of the user (owner) with respect to other users. At this time, when the data for the relationship between the user (owner) and other users is applied to the learned data recognition model as input data, the learned robot 100 may determine a reaction to be output with respect to the input data. For example, when the learned robot 100 receives data of other users, the robot 100 may output a negative reaction to other users.

Figure 18B:
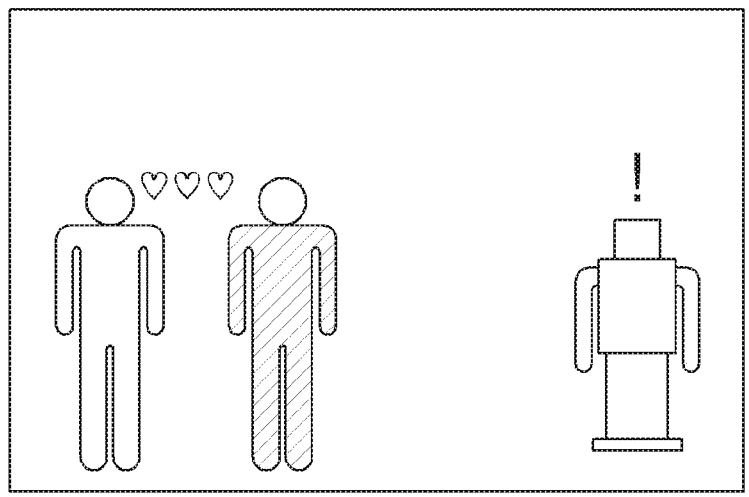
Figure 18B:
Figure 18B:
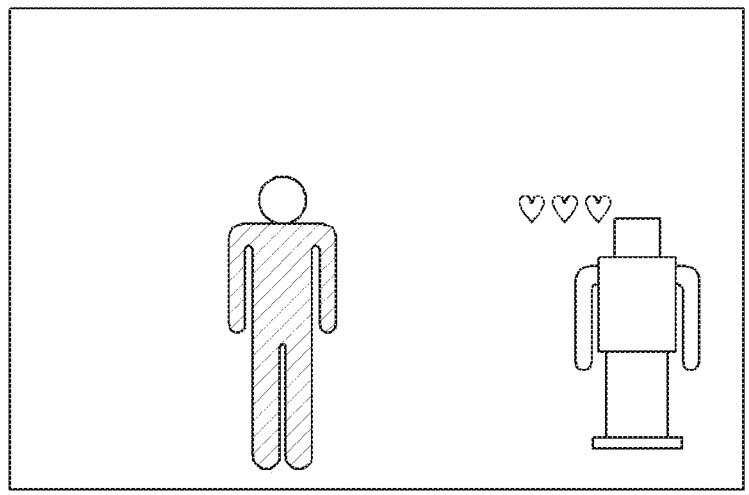

Alternatively, as illustrated in FIG. 18B, when the user (owner) always gives affection to other user, the robot 100 may learn a user state for an attitude of the user (owner) with respect to other users. At this time, when the robot 100 receives data of other users, the robot 100 may output a positive reaction to other users.

In addition to the above-described examples, the robot 100 may learn various user data. As an example, the robot 100 may learn an operation for each emotion of the user, or may learn a user's habitual behavior. As another example, the robot 100 may learn a language such as a specific expression, a word usage pattern, and an emphasis word frequently used by the user. As still another example, the robot 100 may learn sound (e.g., user audible frequency sound) that the user mainly reacts, age-specific sound (sound of infants, children, adolescents, and the elderly), loudness of sound, and pitch of sound. As another example, the robot 100 may learn a user's peripheral usage pattern with respect to the peripheral used by the user. As another example, the robot 100 may learn data such as a user's schedule, a busy level of the schedule, and a stress level according to the schedule. As still another example, the robot 100 may learn data on a user's interest field, a user's intellectual level, and contents (e.g., foreign language words) that the user frequently forgets. As still another example, the robot 100 may learn about a user's surrounding relationship and intimacy of the relationship.

On the other hand, even if all components constituting the embodiments of the disclosure are described as being combined or operated as one, the invention is not necessarily limited to these embodiments. That is, within the scope of the disclosure, all of the components may be selectively combined in one or more and operated. In addition, all of the components may be implemented by one independent hardware, respectively, but may be implemented as a computer program having a program module in which some or all of the components are selectively combined to perform some or all of functions combined in one or a plurality of hardware.

At least a portion of a device (e.g., modules or functions thereof) or a method (e.g., operations) according to diverse embodiments may be implemented with instructions stored in a non-transitory computer readable media in the form of a program module. When the instructions are executed by a processor (e.g., the processor 130), the processor may perform functions corresponding to the instructions.

Here, the program is stored in a non-transitory recording medium that may be read by a computer, and is read and executed by the computer, thereby implementing the embodiments of the disclosure.

Here, the non-transitory readable recording medium means a medium that stores data semi-permanently and that may be read by a device, and includes registers, caches, buffers, and the like, and does not include a transmission medium such as a signal or a current.

Specifically, the programs described above may be stored and provided on a non-transitory readable recording medium such as a CD, a DVD, a hard disk, a Blu-ray disk, a USB, an internal memory (e.g., the memory 150), a memory card, a ROM or a RAM.

In addition, the method according to the disclosed embodiments may be provided as a computer program product.

The computer program product may include an S/W program, a computer readable storage medium on which the S/W program is stored, or a product traded between a seller and a buyer.

For example, the computer program product may include an electronic device or a product (e.g., a downloadable app) in the form of an S/W program that is electronically distributed through an electronic device manufacturer or an electronic market (e.g., Google Play Store, App Store). For electronic distribution, at least a part of the S/W program may be stored in a storage medium or temporarily generated. In this case, the storage medium may be a server of the manufacturer or the electronic market, or a storage medium of a relay server.

Although the embodiments of the disclosure have been illustrated and described above, the disclosure is not limited to the above-described specific embodiments and may be variously modified by those skilled in the art without departing from the gist of the disclosure as claimed in the claims, and such modifications should not be individually understood from the technical spirit or the prospect of the disclosure.

The invention claimed is:

1. A control method for a robot using an artificial intelligence model, the control method comprising:
   acquiring user data related to at least one user;
   training the artificial intelligence model to acquire an emotional state for each of the at least one user by inputting the user data related to the at least one user to the artificial intelligence model, the user data comprising at least one image data;
   acquiring first data related to a first user, the first data including information regarding a first schedule of the first user;
   determining, based on the first data, a first emotional state of the first user by inputting the first data to the trained artificial intelligence model;
   controlling the robot to output a first reaction based on the first data and the first emotional state;
   determining a character of the robot based on a character area of a character model including a first axis indicating whether an emotion of the robot is positive or negative and a second axis indicating an activity of the robot, wherein the character area of the character model is determined based on a feedback of the first user for the first reaction, a number of interactions with the first user and a service completion rate representing an accuracy of the first reaction of the robot;
   acquiring second data related to the first user after determining the character of the robot;
   determining, based on acquiring the second data related to the first user, a second emotional state of the first user by inputting the second data to the trained artificial intelligence model; and
   controlling the robot to output a second reaction based on the second emotional state and the character of the robot.

2. The control method of claim 1, further comprising:
   detecting, by the robot, a second user;
   determining a third emotional state by inputting third data related to the second user to the artificial intelligence model; and
   controlling the robot based on a representative reaction corresponding to the determined third emotional state.

3. The control method of claim 1, wherein training the artificial intelligence model comprises:
   clustering a plurality of learning data into a plurality of clusters by inputting the plurality of learning data into the artificial intelligence model; and
   labeling emotional states corresponding to respective clusters of the plurality of clusters.

4. The control method of claim 3, further comprising:
acquiring a variance value of learning data included in a cluster generated by the clustering; and
determining a representative reaction of the cluster by analyzing the acquired variance value.

5. The control method of claim 4, wherein the representative reaction includes at least one of a facial expression reaction, a motion reaction, or a voice reaction.

6. The control method of claim 4, wherein controlling the robot to output the first reaction comprises:
determining a robot reaction corresponding to the representative reaction; and
outputting the robot reaction.

7. The control method of claim 6, wherein the character of the robot is determined according to a number of interactions with the first user, the first emotional state, and a degree of completion of the robot reaction.

8. The control method of claim 1, wherein the learning data includes at least one of the image data, voice data, data about peripheral users, or data received from peripheral devices.

9. The control method of claim 1, wherein the artificial intelligence model is learned using unsupervised learning, and
wherein the unsupervised learning uses at least one of a K-mean clustering technique or a gaussian mixture model (GMM) technique.

10. A robot using an artificial intelligence model, the robot comprising:
a processor configured to:
acquire user data related to at least one user;
train the artificial intelligence model to acquire an emotional state for each of the at least one user by inputting the user data related to the at least one user to the artificial intelligence model as learning data, the user data comprising at least one image data;
acquire first data related to a first user, the first data including information regarding a first schedule of the first user;
determine, based on the first data, a first emotional state of the first user by inputting the first data to the trained artificial intelligence model;
output a first reaction based on the first data and the first emotional state;
determine a character of the robot based on a character area of a character model including a first axis indicating whether an emotion of the robot is positive or negative and a second axis indicating an activity of the robot, wherein the character area of the character model is determined based on a feedback of the first user for the first reaction, a number of interactions with the first user and a service completion rate representing an accuracy of the first reaction of the robot;
acquiring second data related to the first user after the character of the robot is determined;
determine, based on acquiring the second data related to the first user, a second emotional state of the first user by inputting the second data to the trained artificial intelligence model; and
output a second reaction based on the second emotional state and the character of the robot.

11. The robot of claim 10, wherein the processor is further configured to:
detect a second user;
determine a third emotional state by inputting third data related to the second user to the artificial intelligence model; and
control the robot based on a representative reaction corresponding to the determined third emotional state.

12. The robot of claim 10, wherein the processor is further configured to:
cluster a plurality of learning data into a plurality of clusters by inputting the plurality of learning data into the artificial intelligence model; and
label emotional states corresponding to respective clusters of the plurality of clusters.

13. The robot of claim 12, wherein the processor is further configured to:
acquire a variance value of learning data included in a cluster generated by the clustering; and
determine a representative reaction of the cluster by analyzing the acquired variance value.

14. The robot of claim 13, wherein the representative reaction includes at least one of a facial expression reaction, a motion reaction, or a voice reaction.

15. The robot of claim 13, wherein the processor is further configured to:
determine a robot reaction corresponding to the representative reaction; and
control output of the robot reaction.

* * * * *